US007743332B2

(12) United States Patent
Clark et al.

(10) Patent No.: US 7,743,332 B2
(45) Date of Patent: *Jun. 22, 2010

(54) USER INTERFACE TO DISPLAY AND MANAGE AN ENTITY AND ASSOCIATED RESOURCES

(75) Inventors: Quentin J. Clark, Bellevue, WA (US); Lara N. Dillingham, Seattle, WA (US); Justin Grant, Seattle, WA (US); Boyd C. Multerer, Seattle, WA (US); Ori M. Amiga, Seattle, WA (US); Kent S. Schliiter, Seattle, WA (US); Roger W. Sprague, Redmond, WA (US); Alexander M. Sutton, Seattle, WA (US); Daniel T. Travison, Carnation, WA (US)

(73) Assignee: Microsoft Corporation, Redmond, WA (US)

(*) Notice: Subject to any disclaimer, the term of this patent is extended or adjusted under 35 U.S.C. 154(b) by 1023 days.

This patent is subject to a terminal disclaimer.

(21) Appl. No.: 10/967,392

(22) Filed: Oct. 18, 2004

(65) Prior Publication Data

US 2005/0081156 A1    Apr. 14, 2005

Related U.S. Application Data

(62) Division of application No. 09/606,383, filed on Jun. 28, 2000, now Pat. No. 7,278,103.

(51) Int. Cl.
    *G06F 15/177* (2006.01)
(52) U.S. Cl. .................................................. 715/736
(58) Field of Classification Search ................. 715/734, 715/735, 736, 771
    See application file for complete search history.

(56) References Cited

U.S. PATENT DOCUMENTS

| 5,253,184 | A | 10/1993 | Kleinschnitz |
| 5,742,286 | A | 4/1998 | Kung et al. |
| 5,751,967 | A | 5/1998 | Raab et al. |
| 5,819,028 | A | 10/1998 | Manghirmalani et al. |
| 5,909,689 | A | 6/1999 | Van Ryzin |
| 5,920,700 | A | 7/1999 | Gordon et al. |
| 5,948,055 | A | 9/1999 | Pulsipher et al. |
| 5,956,489 | A | 9/1999 | San Andres et al. |
| 6,064,666 | A | 5/2000 | Willner et al. |
| 6,081,826 | A | 6/2000 | Masuoka et al. |

(Continued)

OTHER PUBLICATIONS

Hong An, et al., "A Java/CORBA Based Universal Framework for Super Server User -End Integrated Environments", Proceedings Technology of Object-Oriented Languages and Systems, 1999, p. 336-341.

(Continued)

*Primary Examiner*—Thanh T Vu
(74) *Attorney, Agent, or Firm*—Workman Nydegger

(57) ABSTRACT

A user interface to display and manage a plurality of entities as if a single entity is provided. The user interface includes a representation of the collection of entities as a whole, and a representation of members associated with the entity. If an action is performed on the representation of the entities as a whole, then the action is propagated to the collection of entities, if the action is performed on the representation of the member associated with the entity, then the action is directed to the member.

15 Claims, 21 Drawing Sheets

U.S. PATENT DOCUMENTS

| | | | |
|---|---|---|---|
| 6,098,093 | A | 8/2000 | Bayeh et al. |
| 6,101,508 | A | 8/2000 | Wolff |
| 6,271,845 | B1 | 8/2001 | Richardson |
| 6,304,549 | B1 | 10/2001 | Srinivasan et al. |
| 6,393,477 | B1 | 5/2002 | Paxhia et al. |
| 6,415,323 | B1 | 7/2002 | McCanne et al. |
| 6,456,306 | B1 | 9/2002 | Chin et al. |
| 6,463,454 | B1 | 10/2002 | Lumelsky et al. |
| 6,466,980 | B1 | 10/2002 | Lumelsky et al. |
| 6,564,342 | B2 | 5/2003 | Landan |
| 6,578,069 | B1 | 6/2003 | Hopmann et al. |
| 6,584,507 | B1 * | 6/2003 | Bradley et al. ............... 709/229 |
| 6,625,643 | B1 | 10/2003 | Colby et al. |
| 6,643,555 | B1 | 11/2003 | Eller et al. |
| 6,691,151 | B1 | 2/2004 | Cheyer et al. |
| 6,701,453 | B2 | 3/2004 | Chrabaszcz |
| 6,732,170 | B2 | 5/2004 | Miyake et al. |
| 6,768,901 | B1 | 7/2004 | Osborn et al. |
| 6,801,949 | B1 * | 10/2004 | Bruck et al. ................ 709/232 |
| 6,868,539 | B1 | 3/2005 | Travison et al. |
| 6,922,724 | B1 * | 7/2005 | Freeman et al. ............. 709/223 |
| 6,961,681 | B1 | 11/2005 | Choquier et al. |
| 7,032,022 | B1 * | 4/2006 | Shanumgam et al. ....... 709/225 |
| 7,093,005 | B2 * | 8/2006 | Patterson .................... 709/220 |
| 2001/0037302 | A1 | 11/2001 | McFadzean et al. |
| 2001/0042118 | A1 | 11/2001 | Miyake et al. |
| 2002/0156866 | A1 | 10/2002 | Schneider |
| 2002/0165745 | A1 | 11/2002 | Greene et al. |
| 2002/0174227 | A1 | 11/2002 | Hartsell et al. |
| 2002/0194251 | A1 | 12/2002 | Richter et al. |
| 2005/0235273 | A1 | 10/2005 | Travison |
| 2005/0232173 | A1 | 11/2005 | Choquier |

OTHER PUBLICATIONS

Buyya R (Reprint), "PARMON: A Portable and Scalable Monitoring System for Clusters", Software-Practice & Experience, 2000, p. 723-739, vol. 30, No. 7.

M. Brune, et al. "Managing Clusters of Geographically Distributed High-Performance Computer", Concurrency: Practice and Experience, Jul. 1999, p. 887-911.

R. Butler, et al., "A National-Scale Authentication Infrastructure", Computer, Dec. 2000, pp. 60-66, vol. 33, No. 12.

R.E. Deemer, "Advanced Engineering Environments: Achieving the Vision," 2000 IEEE Aerospace Conference. Proceedings, Mar. 18-25, 2000, pp. 547-554, vol. 5.

Office Action dated Aug. 22, 2007 cited in U.S. Appl. No. 11/185,147 (Copy Attached).

Office Action dated Jan. 28, 2008 cited in U.S. Appl. No. 11/185,147 (Copy Attached).

Office Action dated Apr. 15, 2009 cited in U.S. Appl. No. 11/185,147 (Copy Attached).

Office Action dated Apr. 18, 2008 cited in U.S. Appl. No. 10/967,739 (Copy Attached).

Office Action dated Feb. 5, 2009 cited in U.S. Appl. No. 10/967,739 (Copy Attached).

Office Action dated Dec. 28, 2007 cited in U.S. Appl. No. 11/063,425 (Copy Attached).

Office Action dated Jun. 30, 2008 cited in U.S. Appl. No. 11/063,425 (Copy Attached).

Office Action dated Nov. 14, 2008 cited in U.S. Appl. No. 11/063,425 (Copy Attached).

Office Action dated Jul. 21, 2009 cited in U.S. Appl. No. 11/063,425 (Copy Attached).

OA Date Oct. 16, 2008 for U.S. Appl. No. 10/967,739, 23 pages.

OA Dated Jul. 11, 2008 for U.S. Appl. No. 11/185,147, 23 pages.

OA Dated Oct. 27, 2008 for U.S. Appl. No. 11/185,147, 21 pages.

* cited by examiner

Fig. 6b

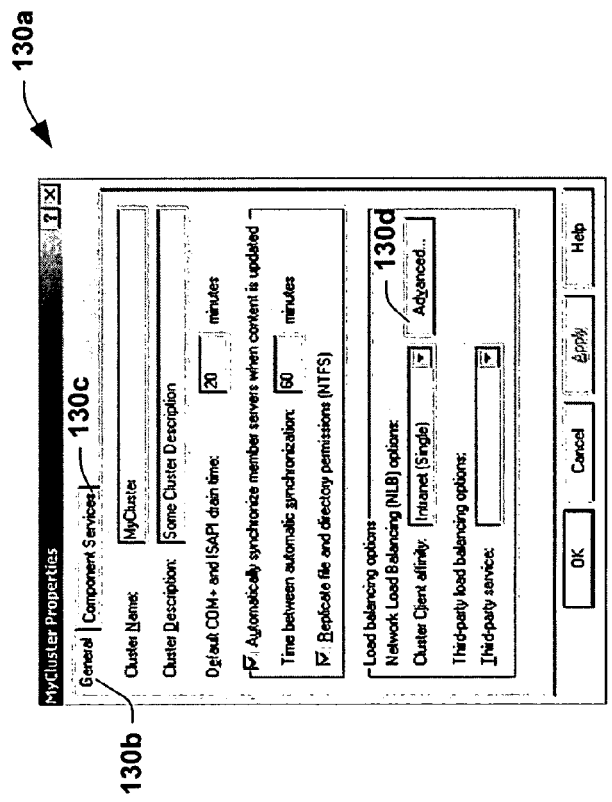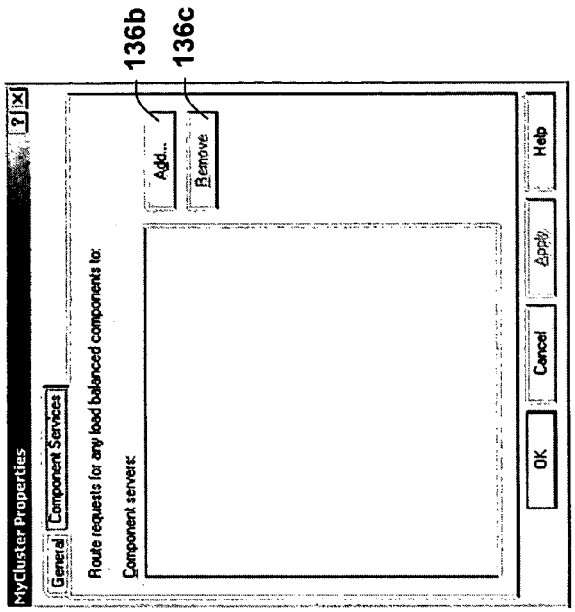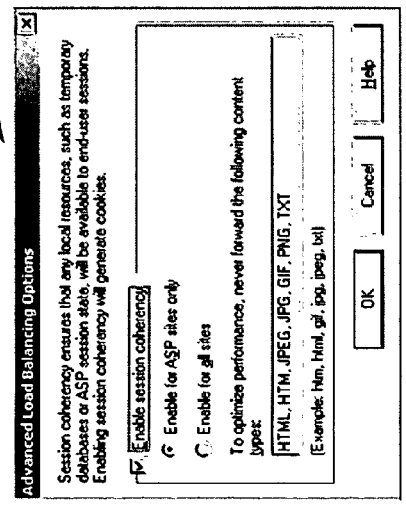
Fig. 8a
Fig. 8b
Fig. 8c

USER INTERFACE TO DISPLAY AND MANAGE AN ENTITY AND ASSOCIATED RESOURCES

REFERENCE TO RELATED APPLICATIONS

This is a divisional application of U.S. patent application Ser. No. 09/606,383 now U.S. Pat. No. 7,278,103, entitled "USER INTERFACE TO DISPLAY AND MANAGE AN ENTITY AND ASSOCIATED RESOURCES", filed Jun. 28, 2000. This application is also related to co-pending U.S. patent application Ser. No. 10/967,739 entitled "USER INTERFACE TO DISPLAY AND MANAGE AN ENTITY AND ASSOCIATED RESOURCES" filed on Oct. 18, 2004. The entireties of the above-noted applications are incorporated herein by reference.

TECHNICAL FIELD

The present invention relates generally to computer systems, and more particularly to a system and method for managing and interfacing to a plurality of computers cooperating as an entity wherein the entity may be interfaced collectively as a whole and/or individually.

BACKGROUND OF THE INVENTION

With the advent of Internet applications, computing system requirements and demands have increased dramatically. Many businesses, for example, have made important investments relating to Internet technology to support growing electronic businesses such as E-Commerce. Since companies are relying on an ever increasing amount of network commerce to support their businesses, computing systems generally have become more complex in order to substantially ensure that servers providing network services never fail. Consequently, system reliability is an important aspect to the modern business model.

A first approach for providing powerful and reliable services may be associated with a large multiprocessor system (e.g., mainframe) for managing a server, for example. Since more than one processor may be involved within a large system, services may continue even if one of the plurality of processors fail. Unfortunately, these large systems may be extraordinarily expensive and may be available to only the largest of corporations. A second approach for providing services may involve employing a plurality of lesser expensive systems (e.g., off the shelf PC) individually configured as an array to support the desired service. Although these systems may provide a more economical hardware solution, system management and administration of individual servers is generally more complex and time consuming.

Currently, management of a plurality of servers is a time intensive and problematic endeavor. For example, managing server content (e.g., software, configuration, data files, components, etc.) requires administrators to explicitly distribute (e.g., manually and/or through custom script files) new or updated content and/or configurations (e.g., web server configuration, network settings, etc.) across the servers. If a server's content becomes corrupted, an administrator often has no automatic means of correcting the problem. Furthermore, configuration, load-balance adjusting/load balance tool selection, and monitoring generally must be achieved via separate applications. Thus, management of the entity (e.g., plurality of computers acting collectively) as a whole generally requires individual configuration of loosely coupled servers whereby errors and time expended are increased.

Presently, there is not a straightforward and efficient system and/or process for managing and administering a collection of independent servers. Many problems are thereby created since administrators may be generally required to work with machines individually to setup content, tools, monitor server state and administer each server. Due to the need to administer and modify content on each machine individually, errors are a common occurrence. For example, it is routine for portions of server content to get out of sync with a master copy of content associated with the collection of servers. Additionally, setting up load-balancing for servers, wherein each server may be given a suitable amount of work, is often a painful and error prone process. For example, load-balancing often requires knowledge of intimate details of load-balancing tools which are often difficult and complex to work with.

Another problem associated with management of a plurality of servers is related to adding additional servers to the system. Adding servers is generally time intensive and error prone since the new server generally must be manually configured as well as having the system content copied to the new server. Furthermore, server configuration settings generally need to be adjusted along with the content.

Still yet another problem associated with management is related to receiving system wide performance results and/or status views of the collection of servers. Some applications may exist that provide performance or status of an individual server, however, these applications generally do not provide performance or status across the logical collection of loosely coupled servers. For example, many times it is important to view information from the collection of servers to determine relevant system-wide performance. Thus, getting a quick response view of pertinent performance information (e.g., requests/second, memory used) associated with the plurality of servers may be problematic, however, since each server generally must be searched independently.

Currently, there is not an efficient and straightforward interface for managing and administering an entity without substantial and sometimes complex individual configuration/monitoring of each member associated with the entity. Consequently, there is an unsolved need in the art for a user interface to manage, create, administer, configure and monitor a group of servers operating as an entity.

SUMMARY OF THE INVENTION

The present invention relates to a user interface to display and manage a plurality of entities as a single entity. For example, the entities may include a plurality of members (e.g., computers, servers, clusters) collectively cooperating as a whole. In accordance with the present invention, a system interface is provided wherein a consistent and unified representation of a plurality of the entities as a whole may be obtained and/or managed from any of the members associated with the entity. Moreover, remote systems may interface with the entity—even if not a member thereof.

The interface enables actions to be performed on the representation of the entities as a whole and/or on representations of members associated with the entity individually. If actions are to be performed on the entities as a whole, the action may be propagated to the collection of entities. If the action is performed on the representation of a member, then the action may be directed to the member. In this manner, system administration, configuration and monitoring are greatly facilitated by enabling a user to send and receive information to the entity as if the entity were essentially a single machine. In contrast to prior art user interfaces wherein any collection of machines connected over a network may need to be administered individually, at each machine site, and/or via separate applications, the present invention provides point entry into the entity from a consistent and singular applications interface that may be directed from substantially any system operatively coupled to the entity (e.g., Internet connection).

More specifically, the present invention provides navigational namespaces that represent the collection of entities as a whole and/or members associated with the entity. In this manner, a hierarchy of entities may be established wherein members and/or other entities may be represented. For example, a first namespace may provide an entity (e.g., cluster) wide view and a second namespace may provide a member view. The entity wide namespace enables users to navigate to pages that provides/distributes information to/from the entity as a whole such as viewing performance and status of members, creating/viewing/editing application manifests defined for deployment to the entity, creating/viewing/filtering event logs aggregated for the entity and specific to each member, and viewing resource monitors (e.g., CPU utilization, memory utilization, server requests/second) aggregated for the entity and/or individually for each member. The member view enables users to navigate to pages designed to provide status and performance views of a particular member such as the manifests, event logs and monitors described above and also view/manage applications deployed across the entity.

In accordance with another aspect of the present invention, an entity (e.g., cluster, plurality of servers) node view may be provided to facilitate management and navigation of each member associated with the entity, wherein a monitor node view facilitates viewing, enabling and disabling monitors associated with performance aspects of the entity and individual members. An events node may further be provided to view and filter aggregated and individual member event logs. A performance view may be provided to facilitate an aggregated status of the entity wherein a status view may provide the overall state and health of each member of the entity. Additionally, member specific status may be viewed within the entity namespace, and an applications view may be provided for editing applications as described above.

According to another aspect of the present invention, administration helpers (e.g., wizards) may be provided to create an entity relationship, add members to the entity and to deploy applications and resources across the entity and/or to systems which may be remote therefrom. In this manner, the entity may be viewed and administered in a singular fashion thus mitigating individual member upgrades and synchronization problems between members. Furthermore, the present invention may be automatically installed by selecting a potential member from the operating system wherein the operating system then directs an installation to the member and then further adds the member to the entity.

According to another aspect of the present invention, management input operations for the entity are provided. From the context of members within the entity, members may be taken online or offline, automatically synchronized and/or not synchronized with the entity, have member weight adjusted for load balancing, specify a dedicated IP address and/or specify suitable load balancing parameters, provide an IIS restart, and/or restart the member.

From the context of the entity as a whole, a user may set entity wide settings such as load balancing, synchronize members that are part of a replication loop, set request forwarding behavior, and/or manage entity wide IP addresses. In order to facilitate management of applications, the user interface may expose a manifest to maintain a list of valid resources that may be deployed, managed and monitored across the entity. To the accomplishment of the foregoing and related ends, the invention then, comprises the features hereinafter fully described.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIGS. 6a and 6b illustrate entity and member event interface displays in accordance with one aspect of the present invention;

FIGS. 8a-8c illustrate entity configuration interface displays in accordance with one aspect of the present invention;

DETAILED DESCRIPTION OF THE INVENTION

Figure 1:
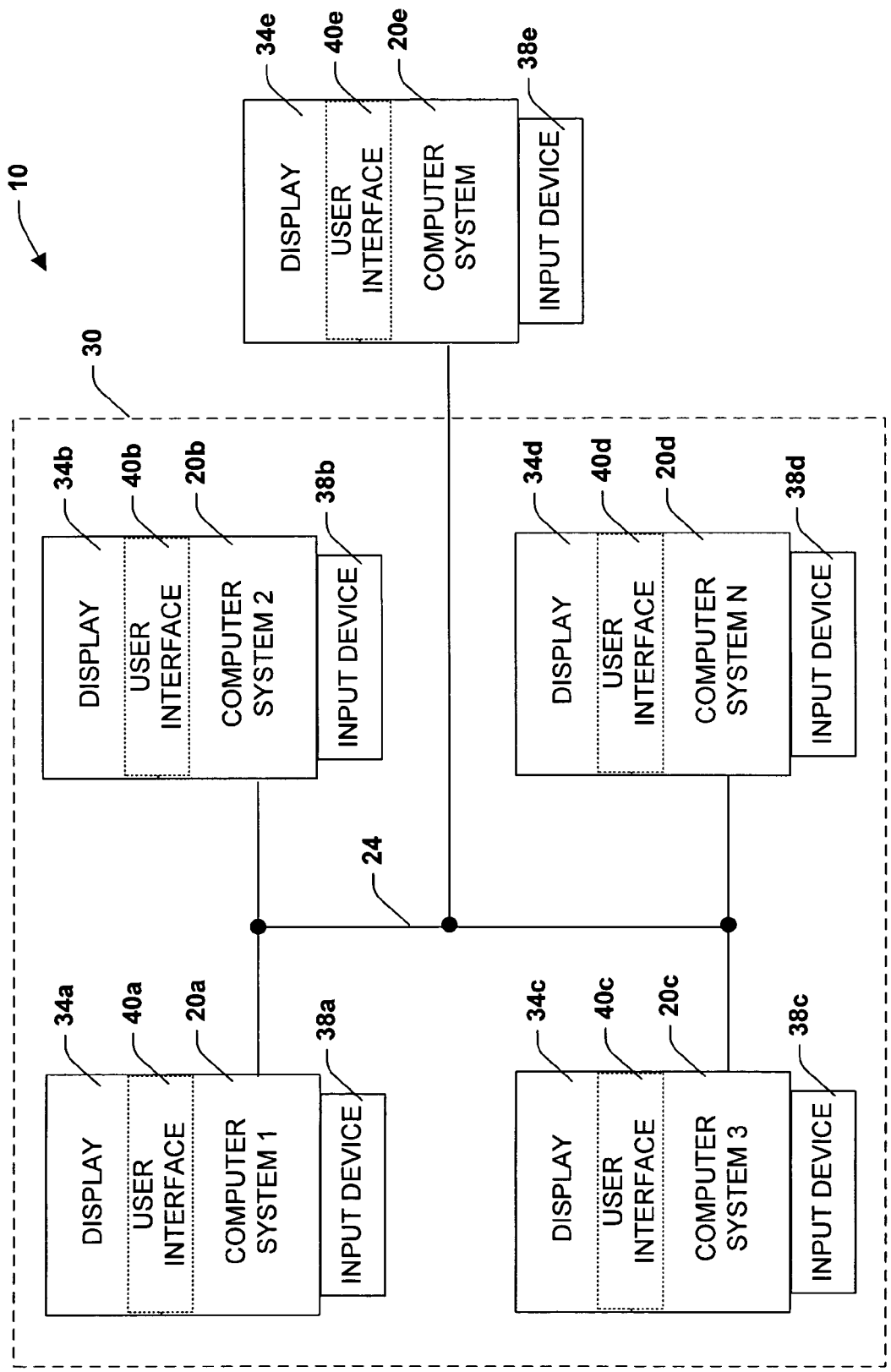
FIG. 1 is a schematic block diagram illustrating a user interface for managing an entity in accordance with one aspect of the present invention.

The present invention is now described with reference to the drawings, wherein like reference numerals are used to refer to like elements throughout.

In accordance with the present invention, a user interface is provided that greatly facilitates management and administration of an entity. The user interface substantially automates management by enabling a user to administer and manage the entity from any of a plurality of systems operatively coupled to the entity. A consistent user experience is therefore provided wherein the entity may be configured and monitored as if the entity were a singular machine—thereby providing a substantial improvement over conventional systems that may require an administrator to individually configure, monitor, maintain, and upgrade each machine comprising the entity. Thus, the present invention saves time and administration costs associated with conventional systems. Moreover, system configurability and troubleshooting is improved since entity members may be operated upon as a collective whole (e.g., viewing system wide performance) and/or individual members may be identified and operated upon.

Management is also facilitated by enabling a user/administrator to manage and configure a plurality of entities and/or entities from a single computer. In accordance with the user interface of the present invention, a user may create entities, join existing entities, add/remove existing members, deploy content (e.g., components, DLLs, data files) across the entity and/or to other entities/servers, configure load balancing and monitor performance. It is to be appreciated that the present invention may manage both homogeneous and non-homogeneous entities. For example, a homogeneous entity may include systems wherein all members share similar applications and resources. A non-homogeneous system may not require all members to be configured the same. As will be described in more detail below, the user interface may include an output such as display objects (e.g., icons, buttons, dialog boxes, pop-up menu's, wizards) and an input (e.g., buttons, selection boxes, user input boxes, wizards) to facilitate creating, joining, managing, monitoring and configuring the entity.

Referring initially to FIG. 1, a system 10 illustrates a particular aspect of the present invention related to a user interface for managing and displaying a plurality of systems cooperating as an entity. A plurality of systems (e.g., computers, servers, machines) for example, computer systems 1 through N (N being an integer) 20a through 20d may be operatively coupled to a network 24 thereby forming an entity 30. Other computer systems that may not be part of the entity 30, such as computer system 20e, may also be coupled to the network 24 for monitoring and administering the entity 30. In order to manage and administer the entity 30, a plurality of displays (e.g., computer monitor) 34a through 34e may provide output, and a plurality of input devices (e.g., mouse, keyboard) 38a through 38e may provide input, to a user interface 40a through 40e herein referred to as the user interface 40.

As depicted by the system 10, the user interface 40 enables a user to administer, monitor, and configure the entity 30 from each member 20a-20d and/or from non-members such as computer system 20e. The user interface 40 provides a consistent interface for the user to manage the entity 30 as if a singular machine. For example, the computer system 20e may be added to the entity 30 via the user interface 40 from any of computer systems 20a through 20e. Consequently, the user does not have to administer (e.g., gain access to each machine) and configure (e.g., download new content/software) each machine individually. Thus, time is saved and errors are mitigated. It is noted that the user interface 40 generally does not have to run on each computer in the system 10. As will be described in more detail below, full entity control may be achieved by interfacing to a controller, for example.

In accordance with the present invention, one of the computer systems 20a through 20d may be configured to operate as a controller for the entity 30. The controller may operate as a master and determine what information is distributed throughout the entity 30. It is noted that the entity may still continue to operate even if the controller becomes disconnected. However, it is to be appreciated that another member may be promoted to a controller at any time.

The user interface 40 may be served with information provided from each member 20a through 20d. This may be achieved by enabling each member to distribute information to the entity 30. Therefore, the interface 40 may provide aggregated information from the entity as a whole—in contrast to conventional systems wherein information may be received and displayed from individual members. For example, computer systems 20a-20d processor performance may be displayed as an aggregation of the output of each member of the entity 30. Any of the displays 34a through 34e may provide a similar consistent view. It is noted that the members 20a through 20d may also be entities. For example, some members could also be a collection of members represented by an entity. Thus, the entity 30 may include members that are entities in their own right.

Alternatively, the user interface enables individual performance to be monitored from any of the displays 34a through 34e by selecting a particular member from a context menu (not shown) as will be described in more detail below. Furthermore, entity configurations may be modified from any of the user interfaces 40 by enabling the user to provide input to the interface and thereby distribute resultant modifications throughout the entity 30. This may be achieved for example, by providing the user input to the controller described above wherein the controller may then distribute the modified configuration throughout the entity 30. It is to be appreciated that other distribution systems may be provided. For example, rather than have entity resources centrally distributed and aggregated at the controller, individual members 20a-20d may share a master file (e.g., XML) describing the resources and content of each member. As new members are added to the entity 30, the resources and content may be distributed/received from any of the members 20a-20d according to the master file.

Figure 2:
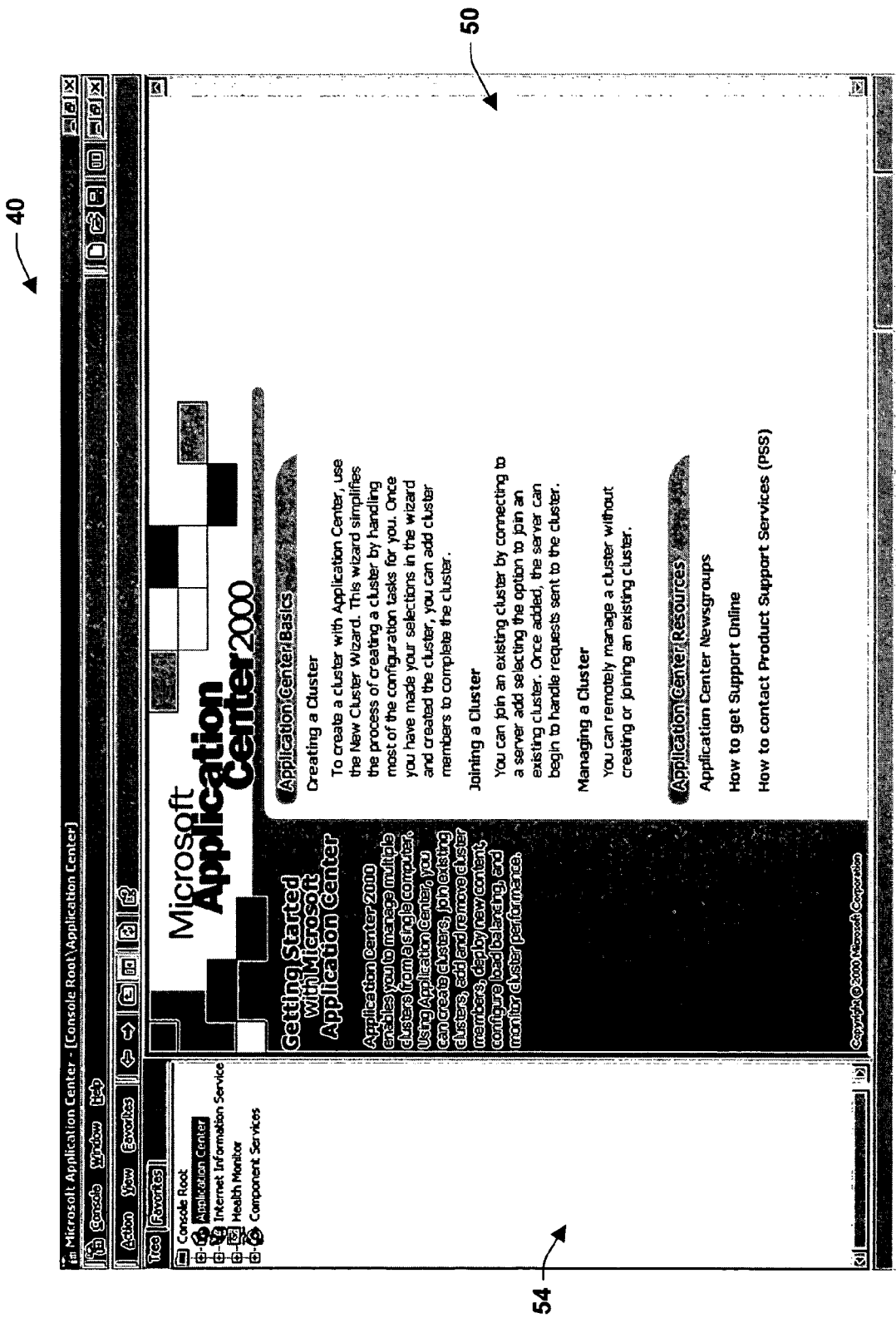
FIG. 2 is an interface display for entity management in accordance with one aspect of the present invention.

Turning now to FIG. 2, a top-level exemplary user interface 40 is depicted according to a particular aspect of the present invention. The user interface 40 may provide a results pane 50 (e.g., Application Center) for viewing display output/receiving user input and a scope pane 54 for selecting particular aspects of monitoring and configuring the entity 30. It is to be appreciated that the scope pane 54 may be presented in other forms, such as for example, in a topological and/or graphical form to enable administrators to direct down to more granular selections to communicate with various members. It is further to be appreciated that other menus and dialogs, as will be described in more detail below, may be selected from a particular display to provide configuration and monitoring. For example, configuration dialogs may be provided in the form of wizards to direct a user through a process to configure a particular aspect of the entity 30. By interfacing with the results pane 50, and providing input corresponding to various selections from the scope pane 54 and other menus, a user may rapidly administer, configure and monitor the entity 30. It is further to be appreciated that the display output and inputs of the present invention (e.g., visual input boxes, buttons, output display menus, icons, windows, etc.) relating to managing an entity may be implemented via well-known development tools. These tools may include for example, Visual C++, Visual Basic, Java, and/or other development tools such as HTML, Front Page, and Dream Weaver.

Figure 3B:
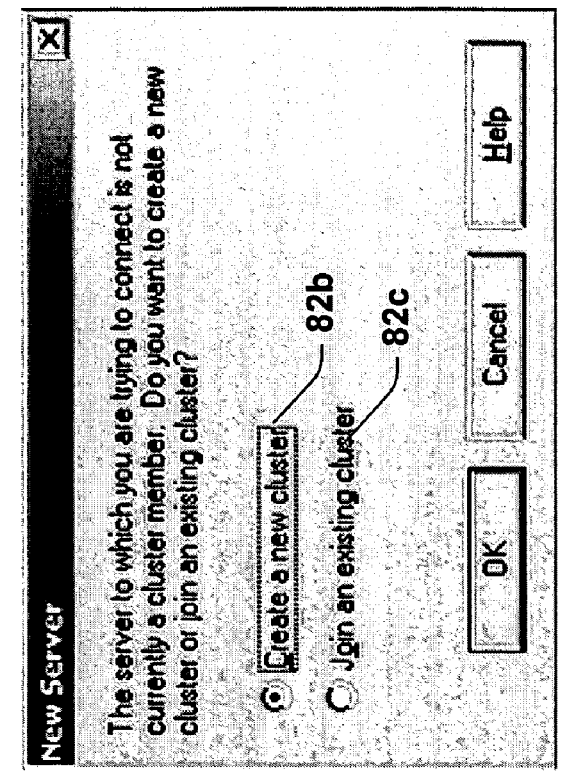
FIGS. 3a and 3b illustrate connection dialogs in accordance with one aspect of the present invention.
Figure 3A:
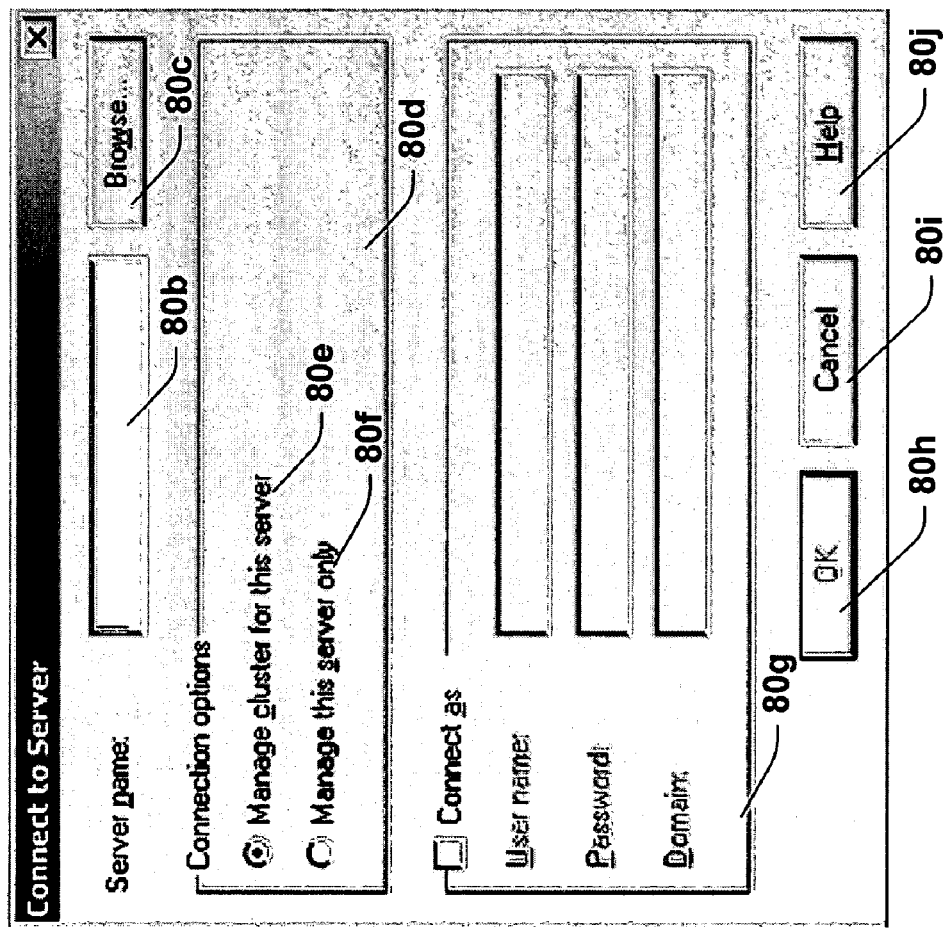

Referring now to FIG. 3a, a connection dialog illustrates a particular aspect of the present invention. When the user selects "connect" from the application menu, a connection dialog 80a may be displayed in the results pane 50 and/or as a separate display object. The connection dialog 80a enables the user to input a desired server (e.g., member) name via an input 80b (e.g., input box, rectangle). A browse input 80c may be provided to enable the user to locate a selected server from a list (not shown) of available members, and a connection options display object 80d may be provided to enable the user to connect to a controller as described above for managing the entity as a whole and/or for managing a particular server directly. For example, an input 80e may enable the user to manage the entire entity and an input 80f may enable the user to manage a particular member. A connect as input section 80g may also be provided to enable the user to enter a username, password, and/or domain name for logging into a desired member. When desired selections described above have been made by the user, an OK input 80h may notify the server of the user's desired selections. A cancel input 80i may be provided to enable a user to close the dialog 80a and dismiss current actions. A help input 80j may also be provided wherein if selected, provides predetermined information to help the user employ the dialog 80a.

If the user attempts to connect to a server that is not associated with the entity, a choose options dialog 82a, illustrated in FIG. 3b, may be provided as display output. The choose options dialog may enable the user to create a new cluster with the selected server by selecting input 82b, or join the selected server to an existing cluster by selecting input 82c. An OK, Cancel and Help input may be provided as described above in reference to the connect dialog 80a.

Figure 4A:
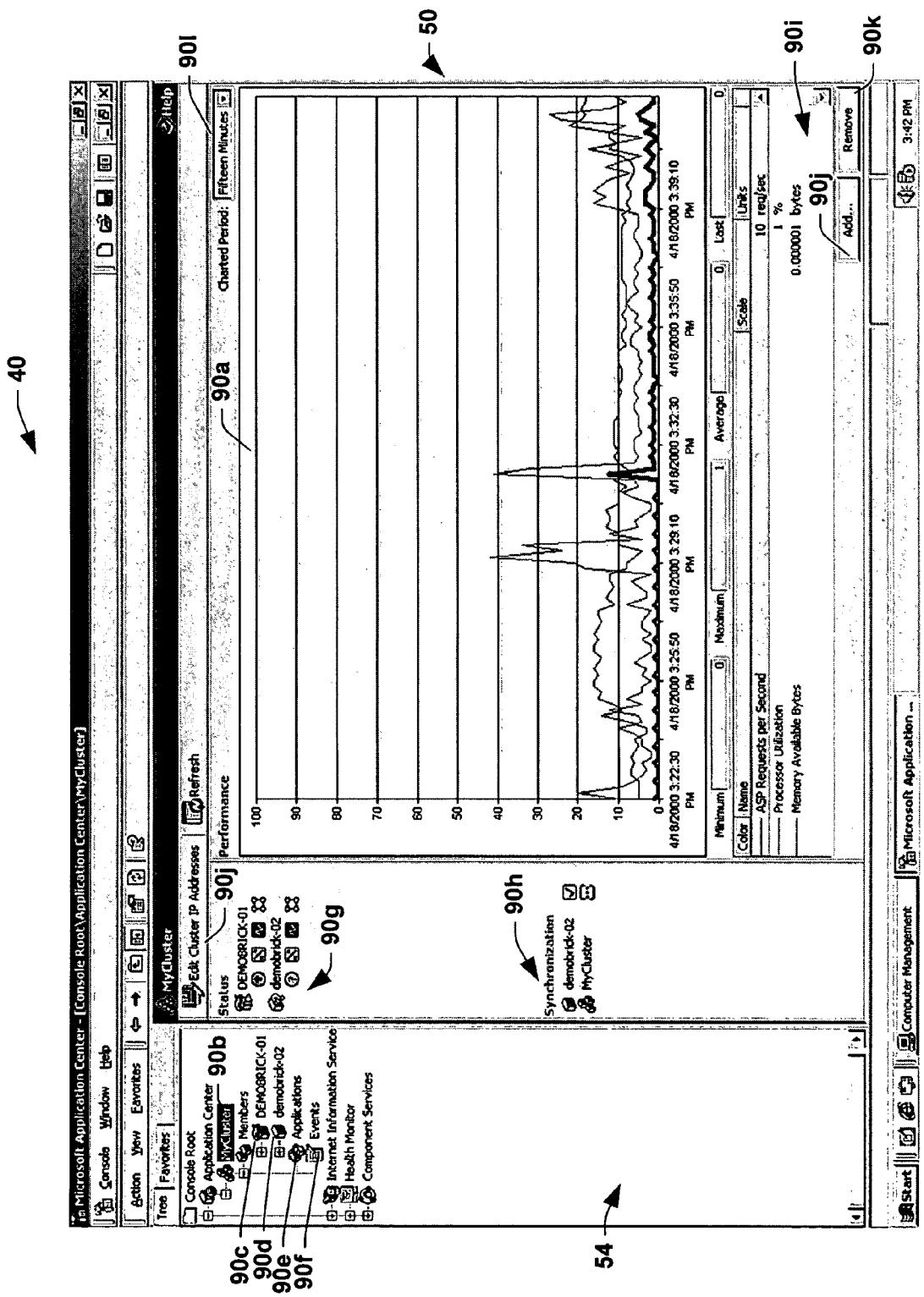
FIGS. 4a and 4b illustrate entity and member performance interface displays in accordance with one aspect of the present invention.
Figure 4B:
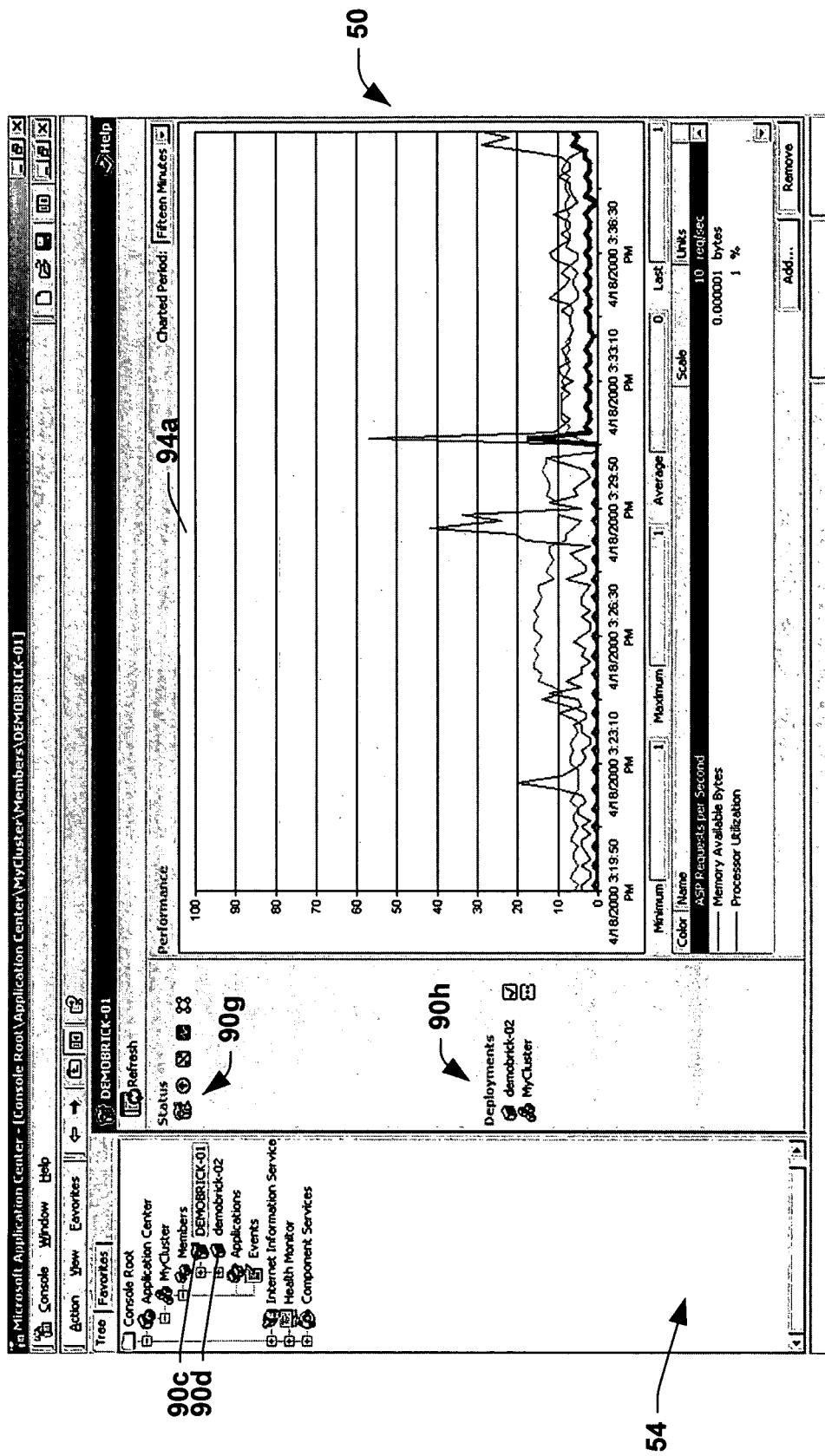

Referring now to FIGS. 4a and 4b, particular aspects of the scope pane 54 and results pane 50 are illustrated. FIG. 4a depicts an entity wide view 90a and FIG. 4b depicts a member view 94a respectively. Referring to FIG. 4a, the entity wide view 90a may be selected via a mouse for example by selecting display object 90b (e.g., entity node MyCluster). From the scope pane 54, a user may then navigate to a plurality of pages (e.g., displayed in the results pane 50 and/or via other menus) that provide performance and status views of the entity as a whole by selecting display object 90b, determine performance and status of each member (e.g., selecting display objects 90c or 90d), create/view/edit application manifests defined for the cluster by selecting display object 90e, view events logs aggregated for the cluster 90f, and view events logs and monitors specific to each member as described in more detail below.

Referring briefly to FIG. 4b, a members view 94a may be provided to enable a user to view pages associated with a particular member by selecting display objects in the scope pane 54 associated with a particular member (e.g., by selecting display object 90b or 90c). As will be described in more detail below, the scope pane 54 selections further enable a user to determine performance and status related to particular cluster members, create/view/edit applications manifests defined for particular members and/or view/enable/disable monitors for that member. In this manner, the scope pane 54 provides a navigational namespace for managing the entity as a whole and/or managing individual members—from any system associated with the entity. Furthermore, each member selection may include context menus, as described below, specific to each member node.

As described above in relation to FIG. 4a, an entity node display object 90b may be provided to display and enable selection of an entity (e.g., cluster). It is to be appreciated that a plurality of entities having associated members may be defined. In order to facilitate management and navigation, each member server (e.g., member node display objects 90c and 90d) may be presented in the entity node view. For example, demobrick-01 and demobrick-02 represent member nodes 90c and 90d, and appear under entity node 90b— MyCluster. The entity node view 90a may be independent of each member's actual topology and additionally may allow for the inclusion of members that are not part of the same subnet, domain, and/or physically near. Additionally, a monitors node selection, depicted and described below, provides for viewing/enabling/disabling associated system monitors, and an events node provides for viewing and filtering entity applications, windows, and/or monitors. Furthermore, logging (e.g., storing specified events) may be enabled/disabled for a specific log and/or a specific severity/source/event ID combination.

As will be described in more detail below, the user interface 40 may provide performance views to enable a user to display to a chart control (e.g., performance counters). The counters may be aggregated for the entity and/or related to a specific member. Additionally, status views may be provided wherein entity wide status may be viewed and/or member status viewed. Status may include health state, load-balancing related status, current synchronization status, entity health metrics, monitor related metrics, and/or synchronization loop state, for example.

If a user selects an entity wide view as described above, a performance display 90a may be provided as depicted in the results pane 50. As illustrated in the scope pane 54, an entity node 90b may be highlighted indicating to the user that performance and status is provided as an aggregated set from members 90c and 90d. For example, a status output 90g may include display objects (e.g., icons) for providing status information such as connection status and on-line status of cluster members 90c and 90d. A synchronization display object 90h may be provided to show that a particular server is set to be synchronized to the entity.

As illustrated in the display output 90a, performance information for the cluster may be aggregated and displayed. The aggregated information may be provided from a plurality of sources such as from counters associated with performance aspects of members serving the entity. For example, a second display output window 90i may provide information regarding particular counters such as processor utilization, memory available, and server requests per second. Inputs 90j and 90k (e.g., Add/Remove) may be provided to add and remove counters from the display 90a respectively. For example, if input Add 90j were selected, a predetermined list (not shown) may be provided to enable the user to select a performance counter for display output. Similarly, counters may be removed by selecting (e.g., mouse highlighting) a counter within the display 90i and then selecting the remove input 90k.

A selection input/output 90l (e.g., rectangle with selection arrow) may be provided to enable the user to see and/or select a suitable time period for monitoring the aggregated data described above. As the time period is modified, the resolution of the display output 90a may thereby be altered accordingly. Additional input selections 90m and 90n may be provided to enable the user to modify the entity IP address (e.g., integrated operating system load balancing shared virtual IP address) and/or refresh the display with updated information respectively.

FIG. 4b illustrates a view similar to FIG. 4a, however, the display output 94a is directed from a particular member. As shown in the scope pane 54, demobrick-01 90c may be highlighted to indicate that data is provided from a member. As depicted in the display 94a, and the status 90g and synchronization displays 90h, output is provided from the selected server—demobrick-01, for example.

Figure 5:
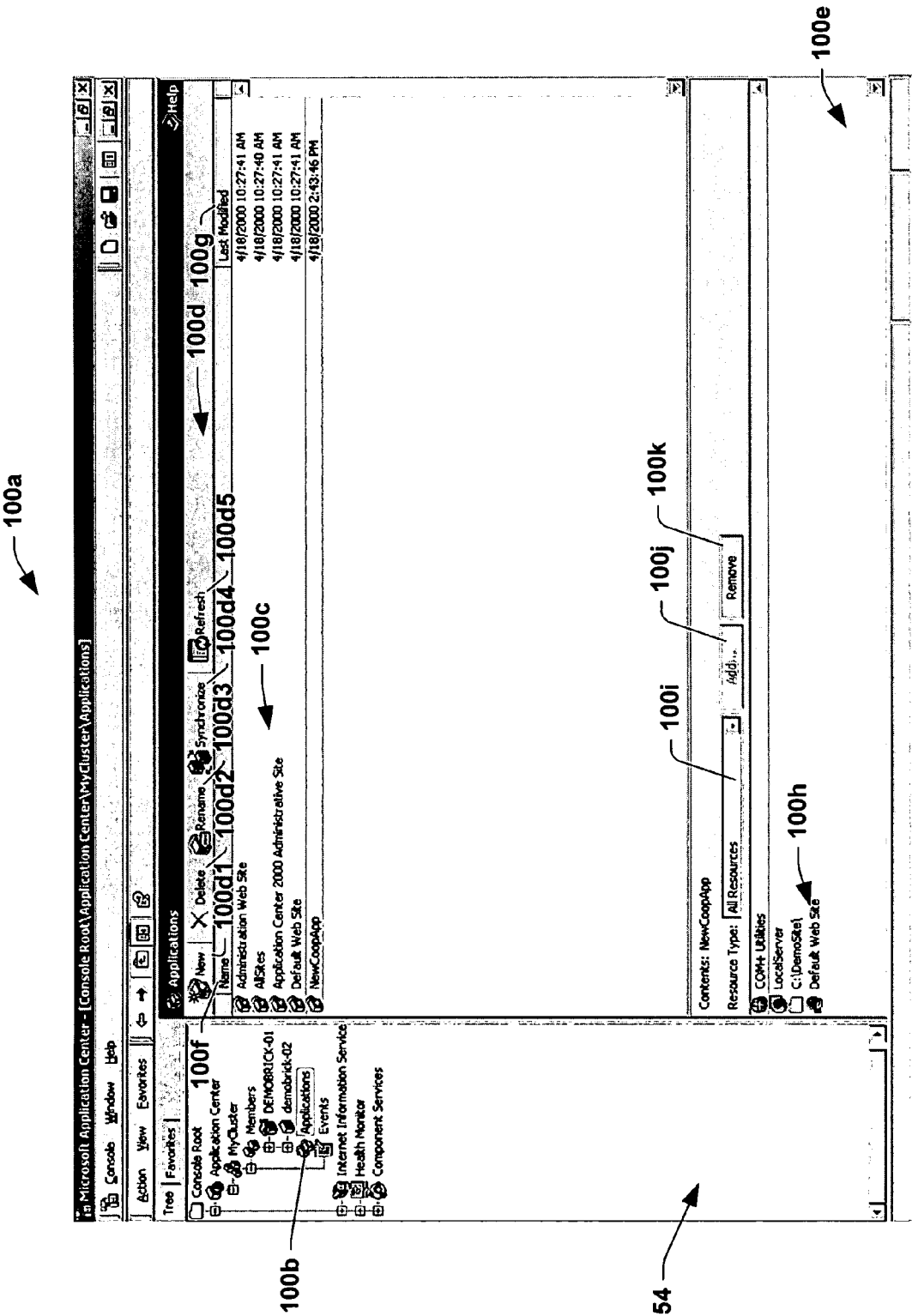
FIG. 5 illustrates a display interface for managing entity applications in accordance with one aspect of the present invention.

Turning now to FIG. 5, an applications management interface 100a is provided in accordance with a particular aspect of the present invention for creating and modifying entity applications. As depicted in the scope pane 54, an applications display object 100*b* may be selected to invoke the applications interface 100*a*. The applications interface 100*a* provides a scalable list 100*c* of applications associated with the entity. The list 100*c* may include sites, components and other content related to an application and facilitates deployment of applications throughout the entity and/or to remote systems not associated with the entity.

An application relating to the list 100*c* may provide a collection of software resources to be utilized for Web site and/or (Component Object Model) COM applications. Applications may include files and directories, Web sites (e.g., IIS), COM+ applications, certificates, registry keys, DSN registry entries, and/or WMI settings, for example. Applications may also be employed for replication and enable administrators to organize sites into logical groups. Furthermore, an application may include more than one Web site and/or other resource, or no Web site at all, yet, still be replicated across the cluster. In this manner, administrators are provided granular control over the process in which replication occurs and/or what resources each member will maintain.

The applications interface 100*a* may provide an applications task bar 100*d* and an applications content display 100*e* for providing information regarding items associated with the list 100*c*. The task bar 100*d* may include a new input 100*d*1, a delete input 100*d*2, a rename input 100*d*3, a synchronize input 100*d*4, and a refresh input 100*d*5. The new input 100*d*1 enables a user to create a new application to be added to the list 100*c*, wherein the delete input 100*d*2 enables a user to delete a selected item from the list 100*c*. The rename input 100*d*3 similarly enables a user to rename a selected application. The synchronize input 100*d*4 directs a synchronization of the selected application across the entity, and the refresh input 100*d*5 may be employed to update and/or refresh a Web Page associated with the entity.

Positioned below the task bar 100*d* is the application list 100*c*. Each application in the list 100*c* may be displayed with an associated name 100*f* and date last modified 100*g*. When an application is selected, the applications content display 100*e* may change to display associated resources for the applications. The content display 100*e* may be employed for displaying and editing a manifest 100*h* (e.g., grouping of associated files) of an application. For example, the manifest 100*h* may include a plurality of resources such as All Resources, Websites/Vdirs, COM+ applications and proxies, registry paths, file system path, certificates and/or DSN settings.

To add a resource to a selected application, the user may select the resource type from an input 100*i* and then select an Add input 100*j*. Another browser (not shown) may then be launched acting as a dialog for that particular resource. When the dialog is closed, and the user selects OK, rather than CANCEL, the list of resources 100*h* may then be refreshed to display the new resource added. If error conditions are detected, (e.g., application removed by another user) the user may be prompted by an error message, and the application list 100*c* and resource list 100*h* may then be refreshed.

To remove a resource, the user may select the desired resource type from the resource type 100*i*. A remove input 100*k* may then be selected. The user may then be then prompted with a YES/NO dialog (not shown) confirming removal of the requested resource. If the user selects YES, the resource may be removed and the resource list 100*h* then updated.

Figure 6A:
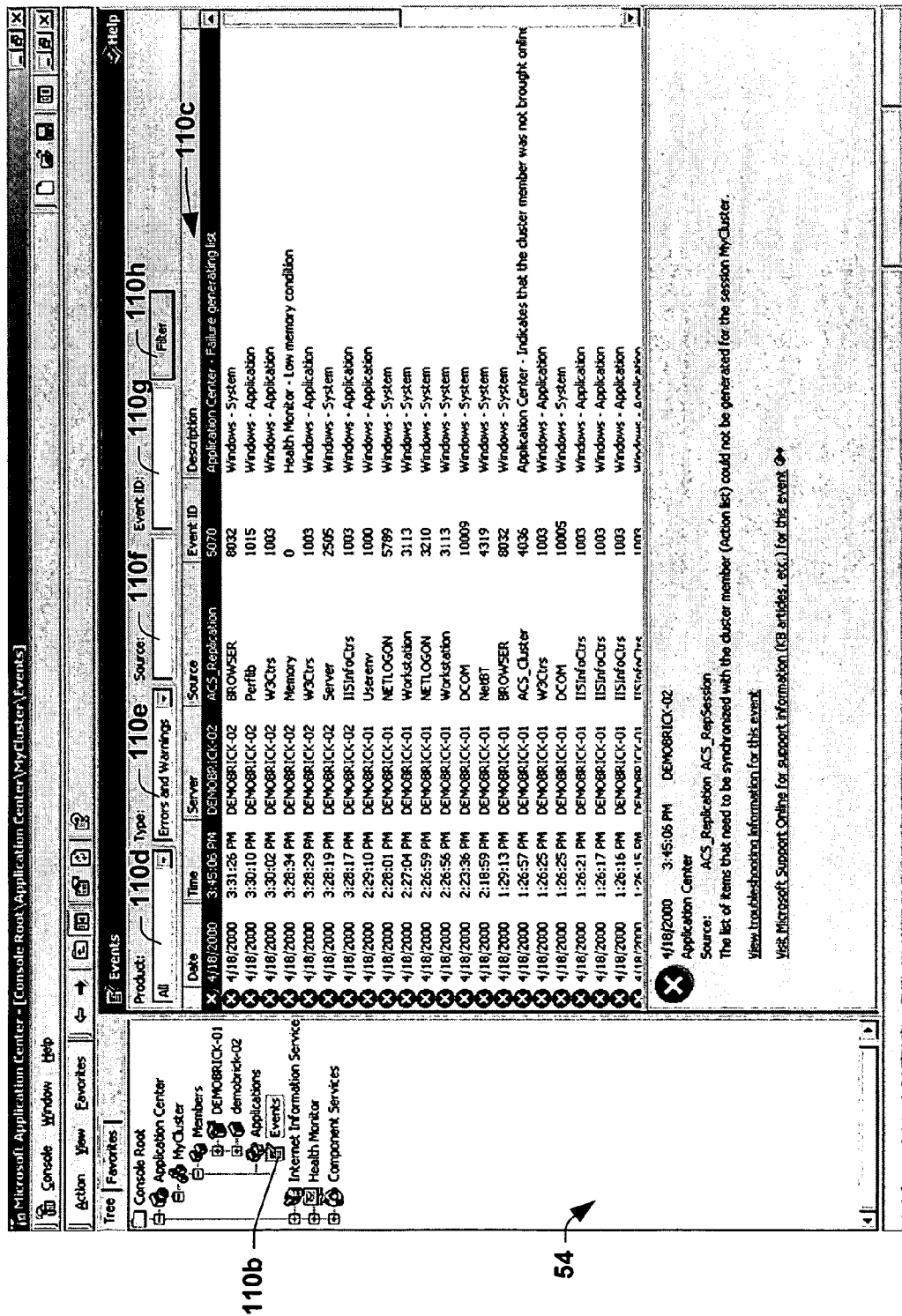

Referring now to FIG. 6*a*, an entity events interface display 110*a* illustrates another aspect of the present invention. The events display 110*a* provides an aggregated view of events that may occur. For example, events, such as errors, warnings, and other system activities, may arise from cluster related operations, operating system operations, and/or from system monitor logs and/or from external entities as well. The events display 110*a* may be selected from an events node display object 110*b* relating to the entity as a whole. Events may be labelled via a description bar 110*c* describing a plurality of columns associated with an event. For example, the columns may include a date, time, server—where event occurred, source—of the event (e.g., workstation, browser), an event ID, and description of event.

Additional inputs may also be included with the events display 110*a*. For example, an input 110*d* enables a user to select which product category a displayed event should be selected from (e.g., operating system, entity operations). A type input 110*e* enables a user to decide which events should be displayed. A source 110*f* and/or event id 110*g* input enables a user to enter selected events to filter (e.g., display only filtered events, do not display filtered events). After the source 110*f* and/or event id 110*g* have been entered, a filter input 110*h* may then be selected by the user to enable the filter for the source and/or event id entered by the user.

Figure 6B:
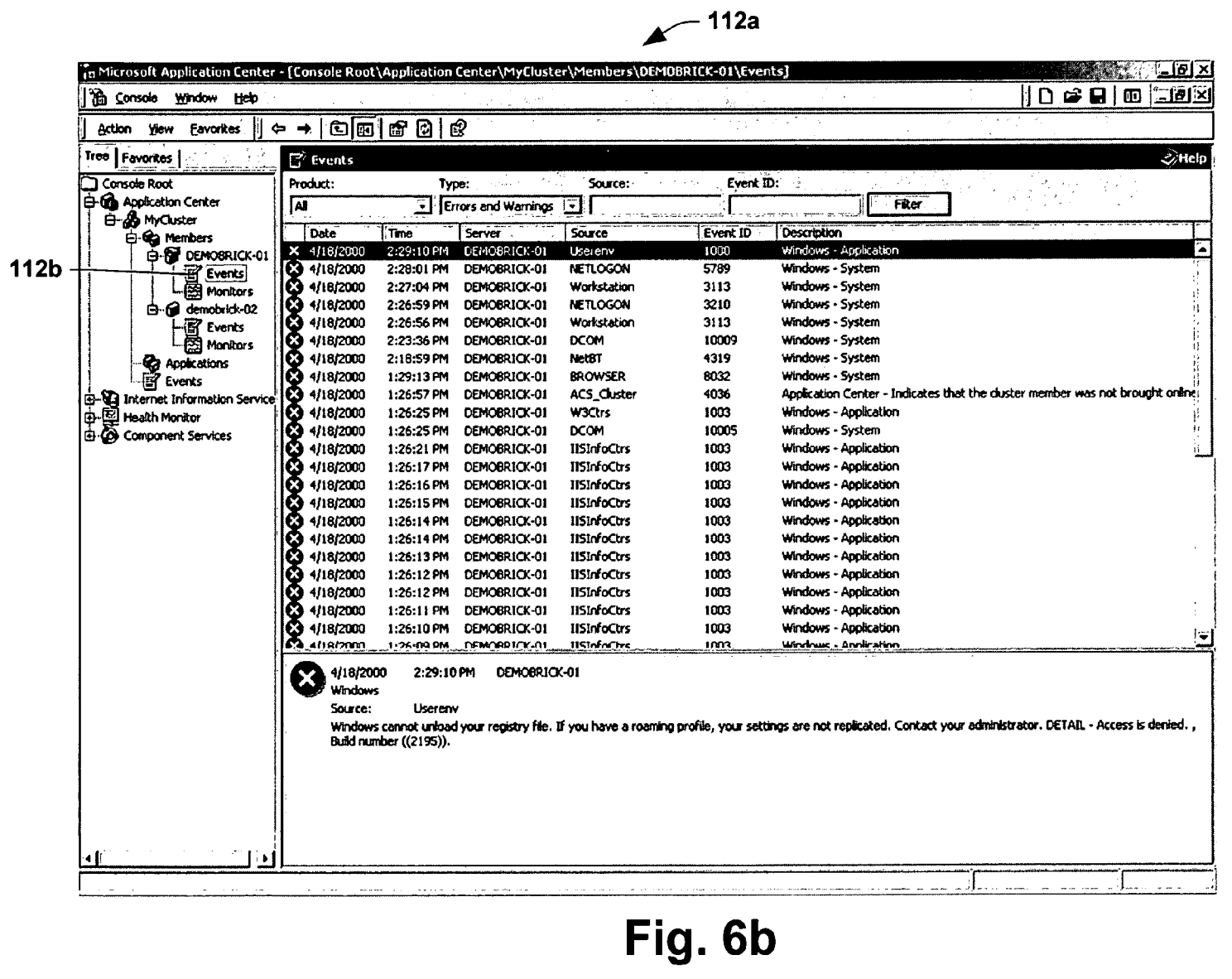

Referring now to FIG. 6*b*, a member events display output 112*a* provides a similar view as described in FIG. 6*a*, however, displayed events may be limited to a selected member in contrast to viewing events for the entity. The member events display 112*a* may be selected for example from the events node display object 112*b* associated with a particular member. As illustrated in FIG. 6*b*, the events display object selected may be associated with server demobrick-01, for example.

Figure 7A:
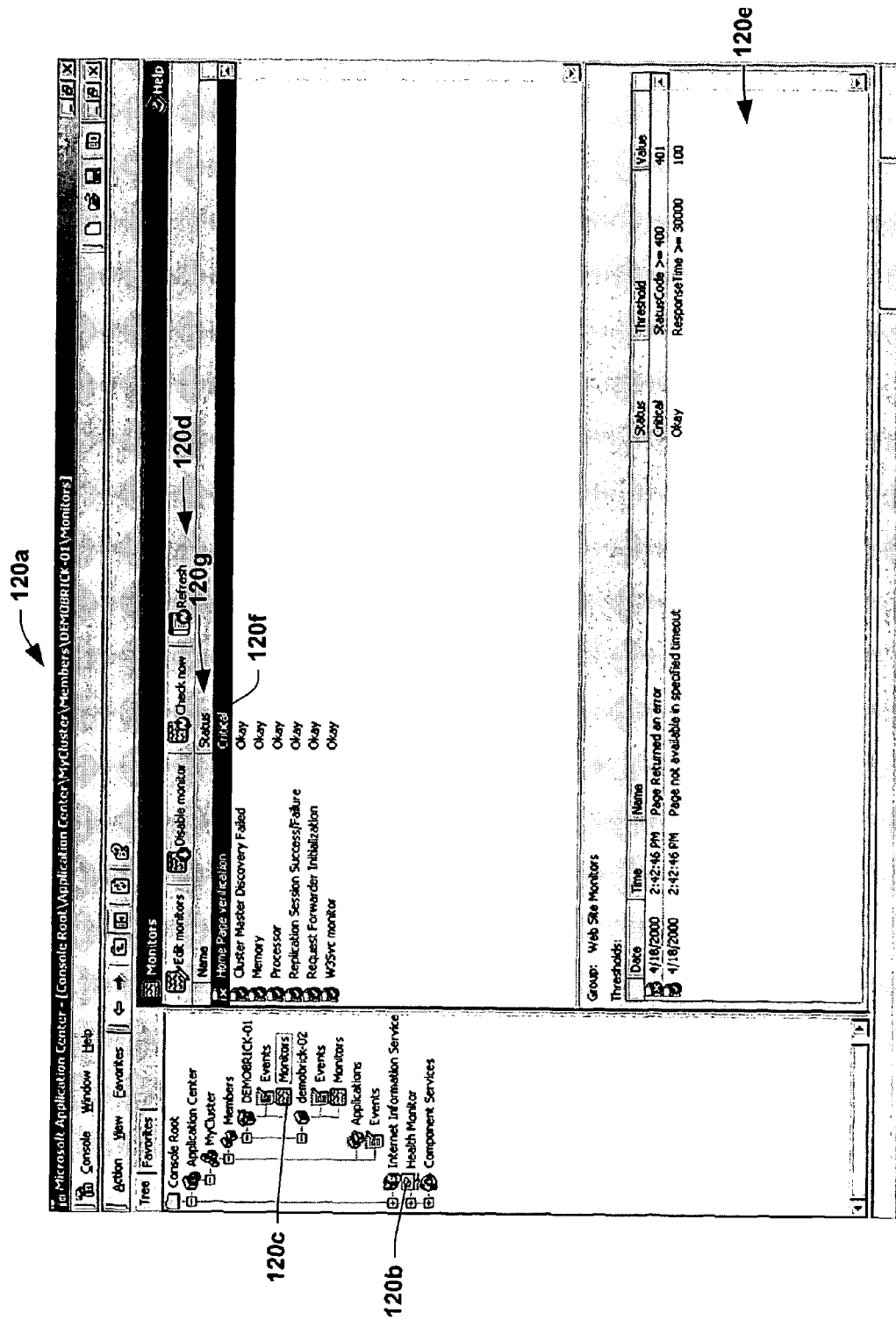
FIG. 7a illustrates a display interface for managing and viewing monitors in accordance with one aspect of the present invention.

Now referring to FIG. 7*a*, a monitor interface display 120*a* relating to various aspects of the entity is illustrated. For example, a health monitoring tool (not shown) may be associated with the entity and/or members. The monitor display 120*a* may then be selected for the entity from a display object 120*b*, for example. Additionally, and as illustrated in FIG. 7, the monitor display 120*a* may be selected for a member from a monitor node display object 120*c*. As depicted in the display output 120*a*, various aspects of system status such as resource status, memory and processor status may be displayed, for example. A task bar 120*d* may be included providing additional user inputs to enable a user to edit a selected monitor, disable a selected monitor, to re-check a selected (e.g., Check now) monitor and/or to refresh the display 120*a*. An additional output display 120*e* may also be provided to provide more details relating to status of a selected monitor. For example, a home page verification monitor 120*f* may be selected. As illustrated for example, a status field 120*g* may display critical and/or OK status. The display output 120*e* provides additional details related to the status. For example, a status field 120*h* may provide a date, time, name, status, threshold for the status, and a value related to a predetermined threshold.

Figure 7B:
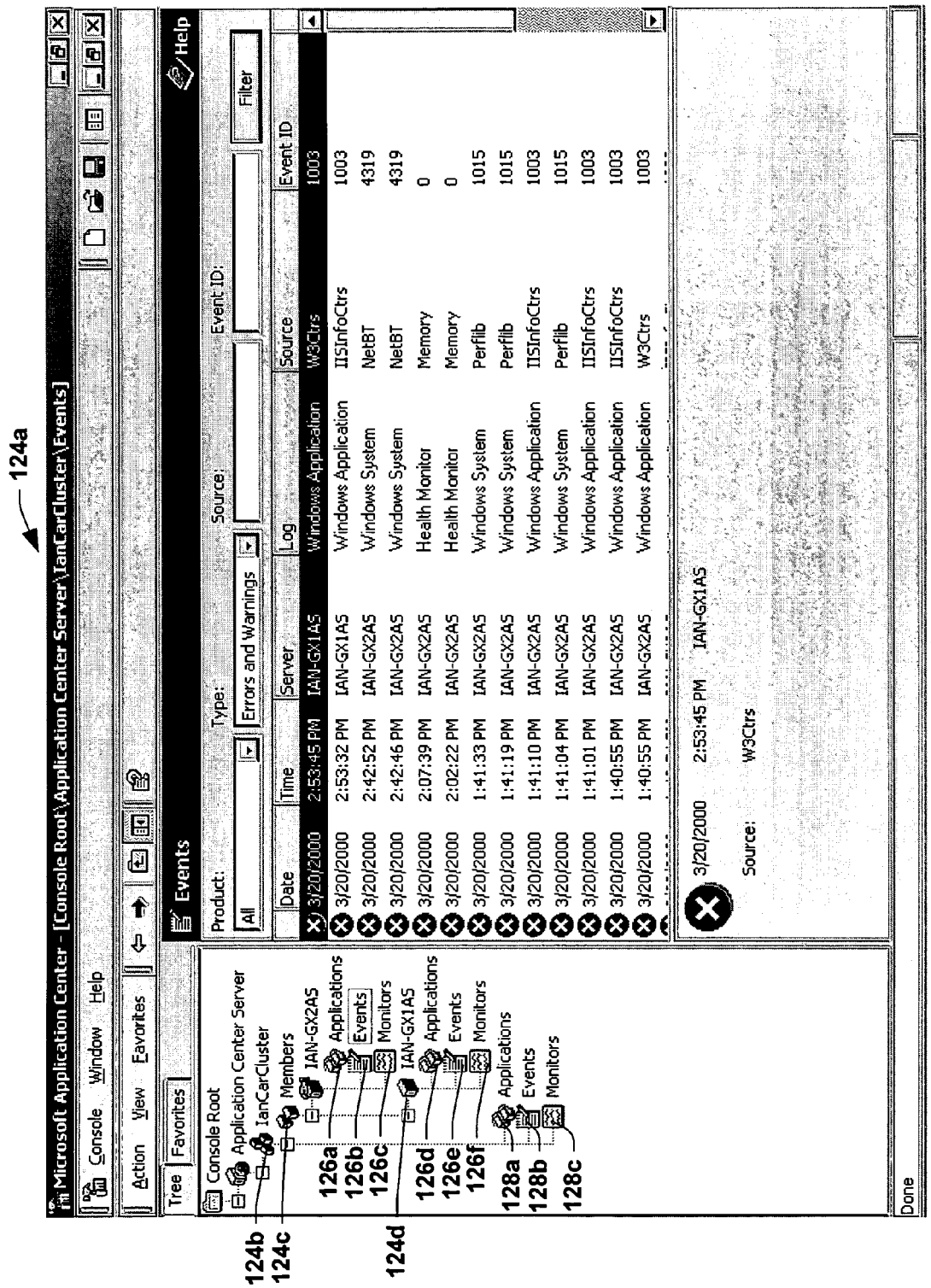
FIG. 7b illustrates a display interface for managing and viewing an entity in accordance with an alternative aspect of the present invention.

Now referring to FIG. 7*b*, another aspect of the present invention depicts a display 124*a* for managing an entity. For example, a display object 124*b* may depict a relationship of a plurality of members 124*c* and 124*d*, for example, wherein applications 126*a*, 126*b*, monitors 126*c*, 126*d*, and/or events 126*e*, 126*f* as described above may be provided for the members 124*c* and 124*d*. Additionally, applications 128*a*, monitors 128*b*, and events 128*c* may be provided for the entity 124*b*. In this manner, entities and members may be alternatively administered. It is noted, although not shown in FIG. 7*b*, that members 124*c* and 124*d* may alternatively be configured and depicted as entities in their own right. For example, the display object 124*b* depicting an entity relationship of individual members 124*c* and 124*d* may alternatively be configured to include members which instead of being configured as members, may be configured similarly to the display object 124*b*. In this manner, the present invention may include a hierarchy for an entity wherein the members are configured as entities. It is to be appreciated that the hierarchy of entities as described above may be extended to include other entities and/or members at a plurality of stages and/or levels—if desired.

Turning now to FIG. 8*a*, a cluster properties page 130*a* illustrates an aspect of the present invention relating to configuration of the entity as a whole. This page may be selected for example via right mouse click on the entity node display object as described above. Tab inputs 130*b* and 130*c* may be provided to select additional options. For example, tab 130*b* may provide general performance options/inputs the user may select and enter. These options may include: setting default COM and default drain time (e.g., time to wait between stopping and taking new users on a server and removing users that may already be there), whether to automatically synchronize members when content and/or configuration is updated, time between automatic synchronization, whether to replicate file and/or directory permissions, and selections relating to load balancing options such as selecting client affinity and/or providing third party load balancing options. An input 130*d* may also be provided wherein advanced load balancing options may be selected. For example, referring to FIG. 8*b*, advanced load balancing options display 134*a* may include whether or not to enable session coherency, selection inputs for which sites coherency should apply, and an input field defining types of files that should not be forwarded.

Briefly referring back to FIG. 8*a*, if tab input 130*c* were selected, a component services page 136*a* as depicted in FIG. 8*c* illustrates a configuration option relating to component routing. The user may then define a list of target servers that are employed for component load balancing (CLB). After the desired servers have been entered, an Add input 136*b* may then be selected to incorporate the server. A remove input 136*c* may also be included to remove any previously added servers from the list.

Figure 9:
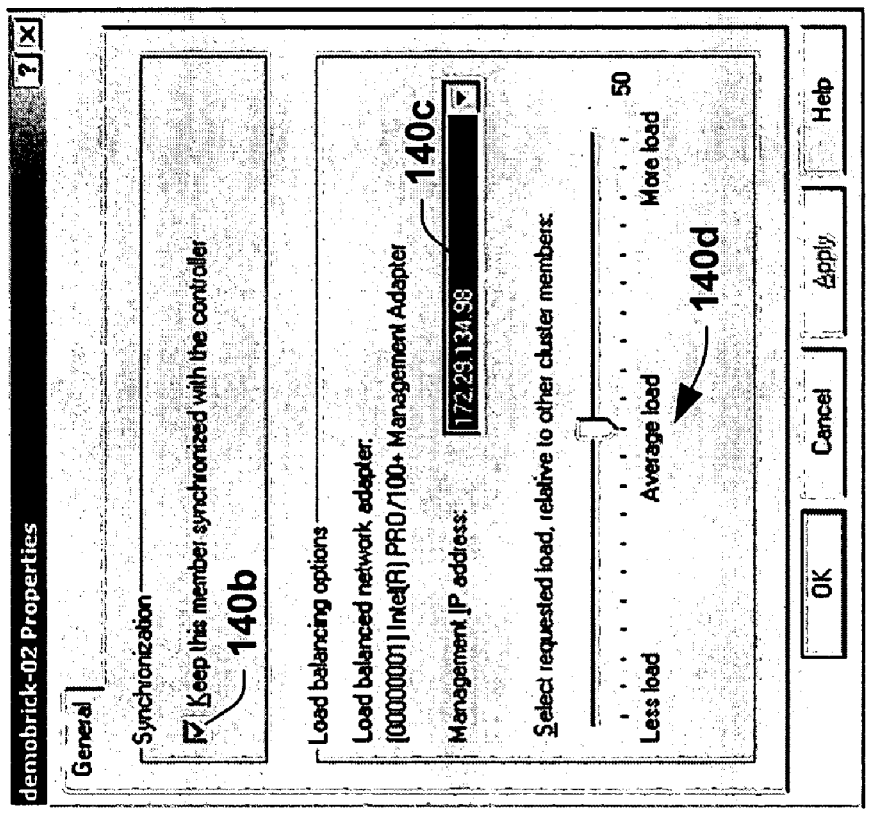
FIG. 9 illustrates a member configuration interface display in accordance with one aspect of the present invention.

In addition to configuring properties as a whole, member properties may also be configured. For example, referring to FIG. 9, a member properties interface 140*a* may be selected (e.g., right mouse click when selecting a member node on the scope pane 54) to provide synchronization and load balancing configurations. A selection input 140*b* may be provided to enable the user to select whether to keep the member synchronized with the controller, for example. Relating to load balancing, an IP address input 140*c* may be provided to enable the user to define an IP address related to load balancing tasks. An adjustment input 140*d* may be provided to enable the user to modify the amount of load a member may maintain in relation to other members. For example, if the adjustment input 140*d* is positioned near the center, the member may be adjusted for an average load in relation to other members if for example, other members also were similarly adjusted to the center.

Figures 10A, 10B:
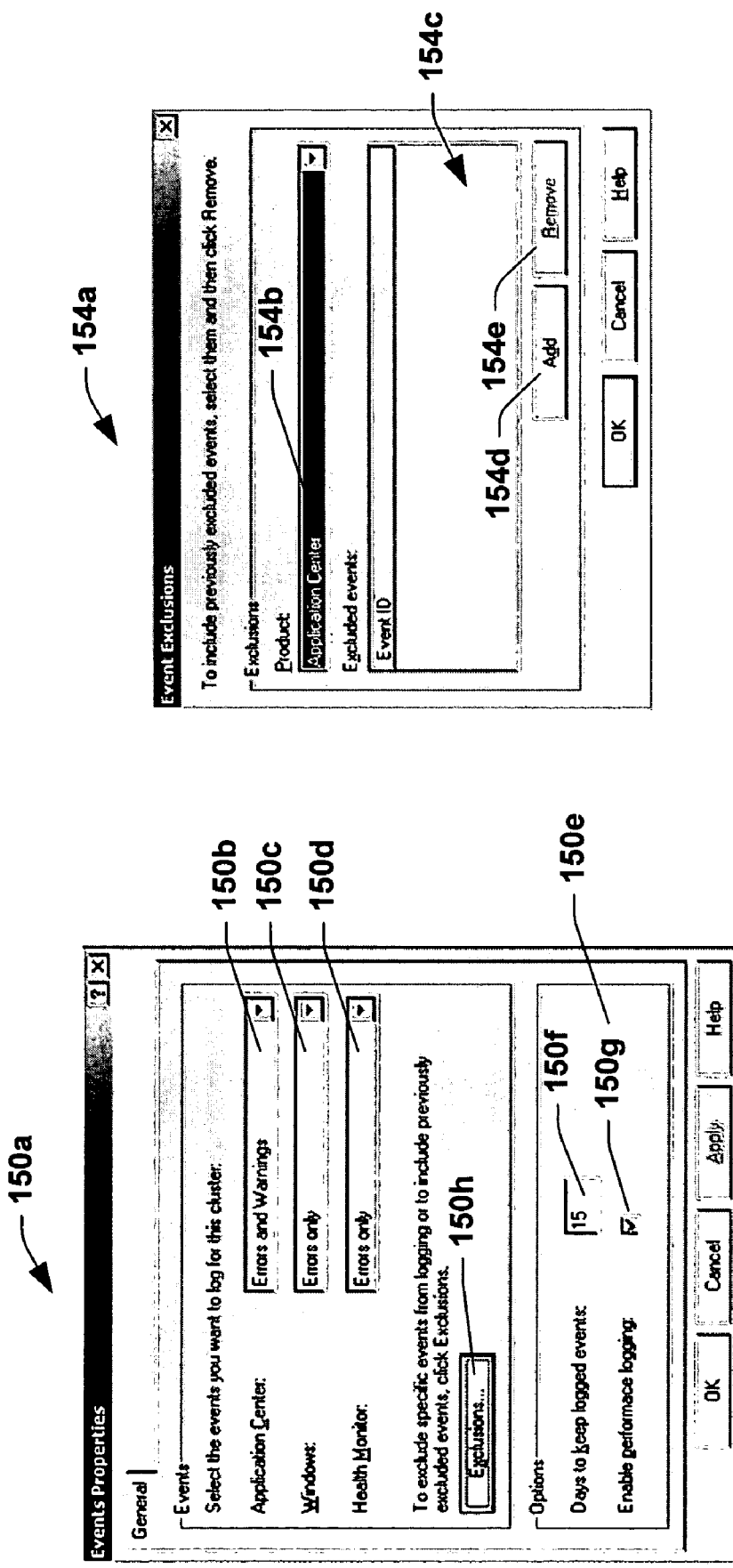
FIGS. 10a and 10b illustrate configuration interface displays for configuring events in accordance with one aspect of the present invention.

Referring now to FIG. 10*a*, an events property interface 150*a* illustrates another configuration aspect in accordance with the present invention. The interface 150*a* may be selected when a user has selected the events node from the scope pane 54 and enables the user to select the types of events to log, from which log to record an event, and for how long to store the logged events. Logs may include inputs for selecting: entity operations 150*b* (e.g., Application Center), operating systems events 150*c* (e.g., Windows/UNIX system events) and/or monitor events 150*d*. The user may then define and/or limit the event types by entering and/or selecting event types in the selection fields for a particular log 150*b*, 150*c* and 150*d* (e.g., Errors Only, Warnings Only, Errors and Warnings, etc.). An options interface 150*e* may also be included to enable the user to determine aspects to employing event logs. For example, how long to store the event logs may be defined by an input 150*f* and whether to enable logging may be selected by input 150*g*.

An exclusions input 150*h* may be provided to enable a user to exclude specific events from logging and/or to re-enable previously excluded events. If the user selects the exclusions input 150*h*, an exclusions dialog 154*a* illustrated in FIG. 10*b* may then be invoked. The exclusions dialog 154*a* enables users to define, at a more granular level, events to exclude from being logged. For example, a product input 154*b* enables a user to define from which portion of the entity to exclude the requested event (e.g., Window, monitor). An event id input 154*c* may be provided to enable the user to define the associated event. For example, if the user were to enter number 1000, a Windows application event may be defined. Add and Remove inputs 150*d* and 150*e* respectively may be provided to add and remove events respectively.

Turning now to FIGS. 11*a* through 11*k*, a configurations interface and process is illustrated relating to creating an entity in accordance with the present invention. The FIGS. 11*a* through 11*k* define a user-oriented process for directing and enabling a user on how to construct an entity. The process may be defined in terms of a wizard, for example, that readily guides the procedure for the user. It is to be appreciated however that other illustrated sequences than depicted by the process wizard may be employed.

Figure 11B:
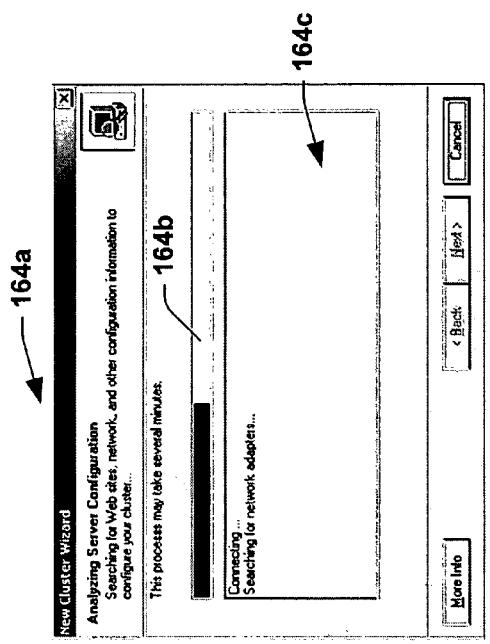
FIGS. 11a-11k illustrates a process for creating an entity in accordance with one aspect of the present invention.
Figure 11D:
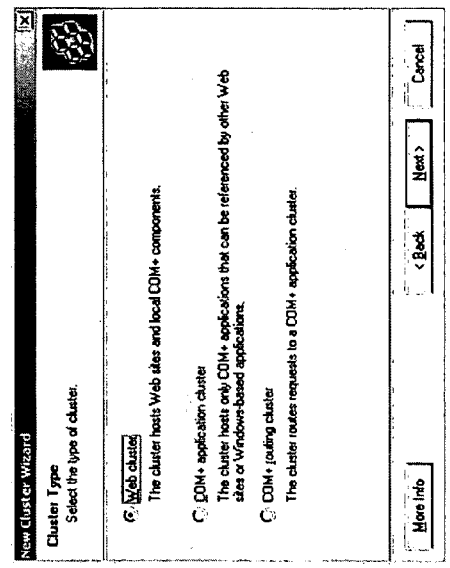
Figure 11A:
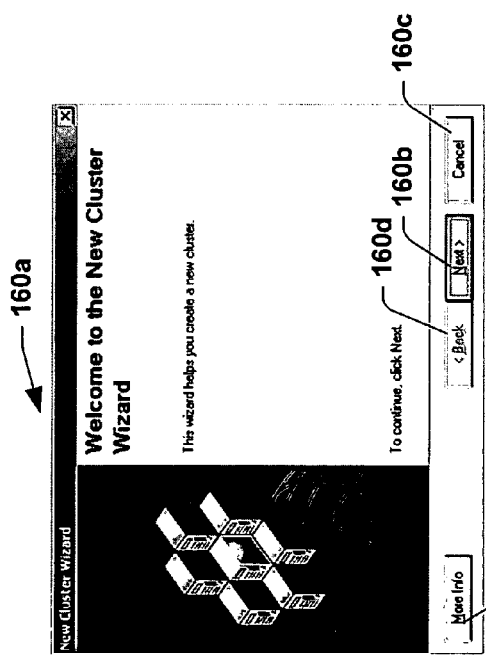

Referring to FIG. 11*a*, a process wizard start 160*a* for creating an entity illustrates a standard welcome page when the wizard is invoked. The wizard may be invoked from any suitable menu input. Selection inputs such as a next input 160*b* and a back input 160*c* are provided to enable the user to get to the next step in the process and/or return to a previous step. A cancel input 160*d* may be provided to enable the user to discontinue the process at any desired time. A more information input 160*e* may be provided to provide the user with additional information for determining a selection. The following description will now be directed to the process of creating an entity in a flow wherein the user proceeds to the next step (e.g., selects the next input 160*b*) in creating the entity. It is to be appreciated that the user may proceed back at each step to modify a previous selection and/or cancel the procedure if so desired.

Proceeding to FIG. 11*b*, a scan display 164*a* may be provided to the user to indicate system processes that may be occurring. A time bar 164*b* and message output 164*c* may be provided to indicate to the user current machine analysis events relating to integrated operating system load balancing (e.g., Network Load Balancing) configuration analysis, IP address checking and other network related analysis, and/or Network Interface Card (NIC) checking, and other related software system analysis, for example. When the time bar 164*b* becomes full, the process may proceed to display FIG. 11*c*.

Figure 11C:
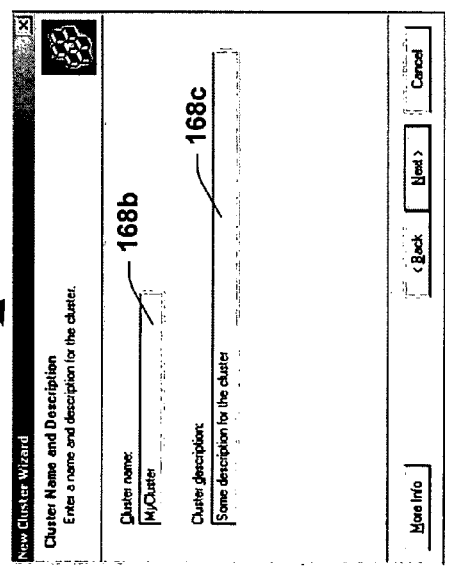
Figure 11F:
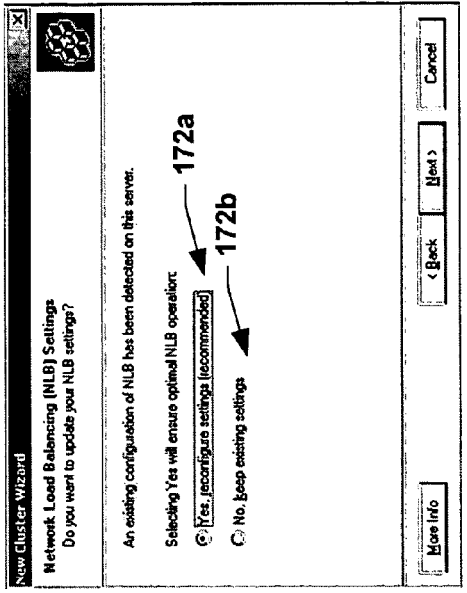
Figure 11H:
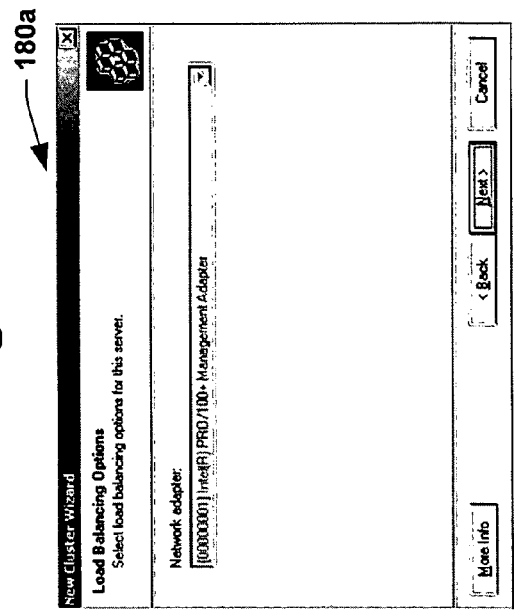
Figure 11E:
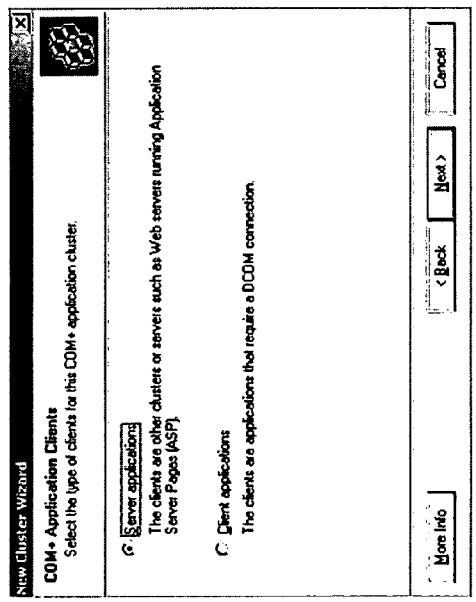

At FIG. 11*c*, the user may be provided a display interface 168*a* with input fields 168*b* and 168*c* to enter a name for the entity and to provide a description if desired. Proceeding to FIG. 11*d*, the process provides selections to enable the user to determine which type of entity may be desired (e.g., Web cluster, COM+ application cluster, COM+ routing cluster). Proceeding to FIG. 11*e*, selections are provided for determining client types for the entity. For example, selections may be provided for determining whether the clients are other clusters and/or servers, and whether special client connections may be required (e.g., DCOM). Proceeding to FIG. 11*f*, and if an integrated operating system load balancer such as Network Load Balancing has been detected on the machine, selection inputs 172*a* and 172*b* may be provided to determine whether the process should modify load balancing settings for the machine. If YES is selected from input 172*a*, the process may then be enabled to reconfigure load balancing settings. If NO is selected from input 172*b*, the process retains existing load balancing settings for the machine.

Figure 11G:
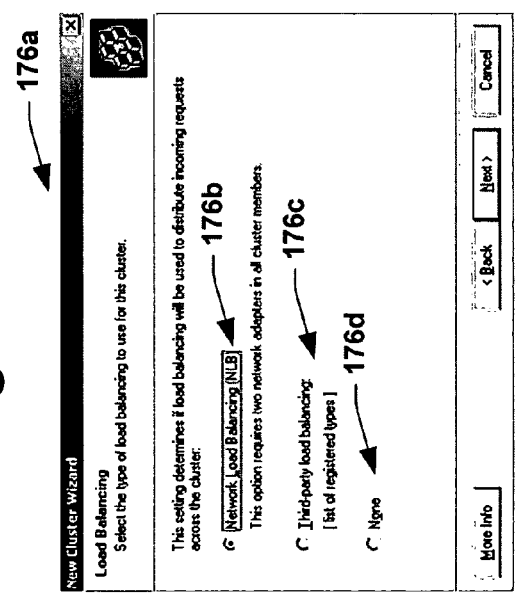
Figure 11J:
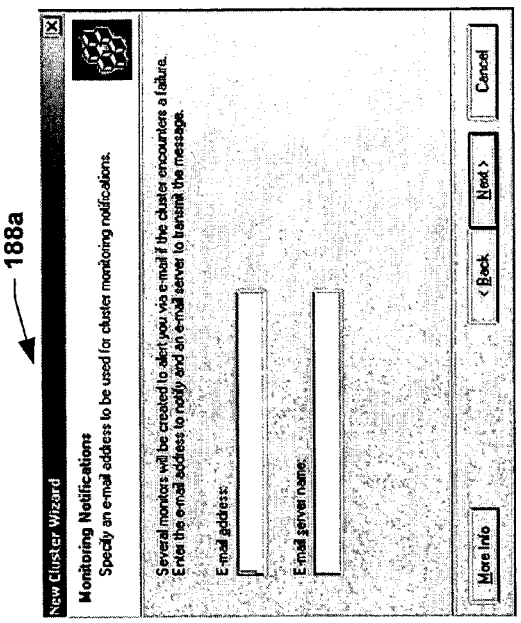
Figure 11I:
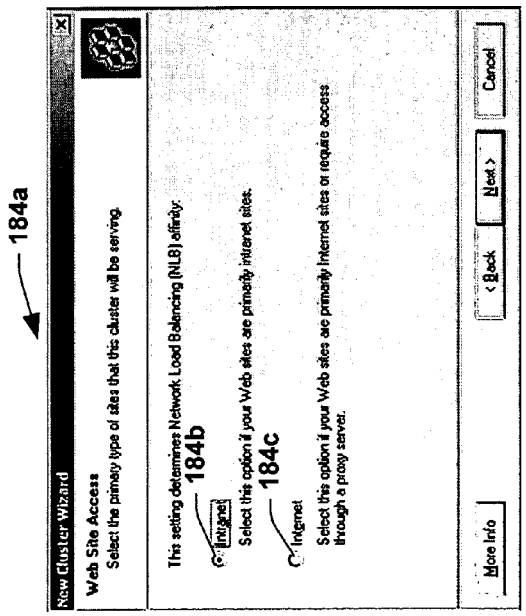
Figure 11K:
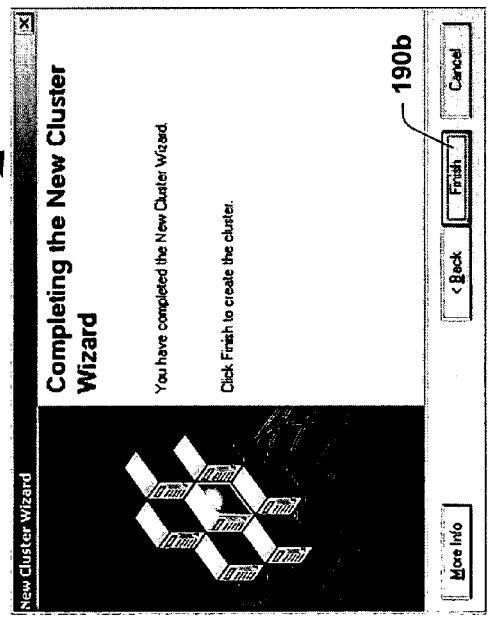

Proceeding to FIG. 11*g*, an interface display 176*a* enables a user to select the type of load balancing desired. For example, an input 176*b* if selected would select an integrated operating system load balancer such as Network Load Balancing. If input 176*c* were selected, an extensible third party load balancer may be selected. Input 176*d* enables the user to select no load balancing for a cluster. Proceeding to FIG. 11*h*, an interface display 180*a* enables the user to select which network interface card (NIC) to employ for load balancing. Proceeding to FIG. 11*i*, an interface display 184*a* is provided if the user has previously selected the integrated operating system load balancer in FIG. 11*g*. Inputs 184*b* and 184*c* may then be provided to enable the user to select a client affinity (e.g., Intranet based, Internet based). Proceeding to FIG. 11*j*, an interface display 188*a* enables a user to enter an e-mail address and e-mail server name wherein the user may be contacted by entity monitor notifications (e.g., failure notices). Proceeding to FIG. 11*k*, a display interface 190*a* finish page may be provided with a finish selection input 190*b* to enable the user to complete the entity creation process and to enable the system to implement the user's selections from the process.

Referring now to FIGS. 12*a* through 12*f*, a configurations interface and process is illustrated relating to adding a member to an entity in accordance with the present invention. The FIGS. 12*a* through 12*f* define a user-oriented process for directing and enabling a user on how to add a server, for example. The process may be defined in terms of a wizard, for example, that readily guides the procedure for the user. It is to be appreciated however that other illustrated sequences than depicted by the process wizard may be employed.

Figure 12A:
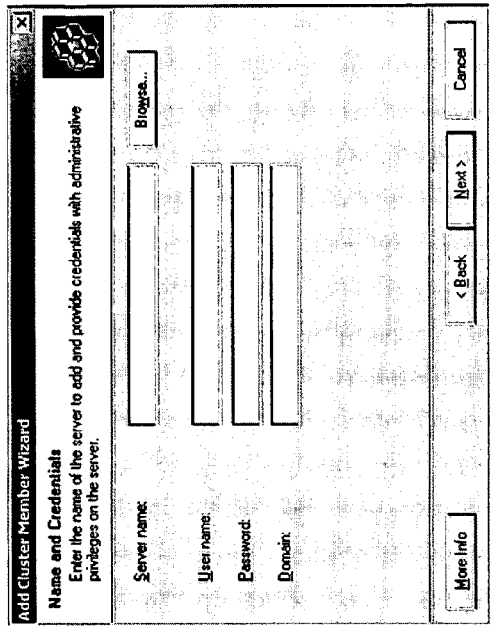
FIGS. 12a-12f illustrates a process for adding a server to an entity in accordance with one aspect of the present invention.

Referring to FIG. 12*a*, a process wizard start 192*a* for adding servers to an entity illustrates a standard welcome page when the wizard is invoked. The wizard may be invoked from any suitable menu input. Selection inputs such as a next input and a back input, as described above, are provided to enable the user to get to the next step in the process and/or return to a previous step. Additionally, as described above in relation to the create entity start page, a cancel input may be provided to enable the user to discontinue the process at any desired time, and a more information input may be provided to provide the user with additional information for determining a selection. The following description will now be directed to the process of adding a server to the entity in a flow wherein the user proceeds to the next step (e.g., selects the next input). It is to be appreciated that the user may proceed back at each step to modify a previous selection and/or cancel the procedure if so desired.

Figure 12B:
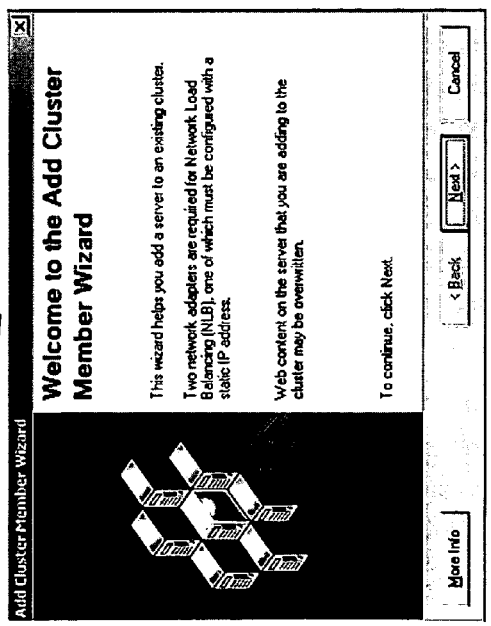
Figure 12C:
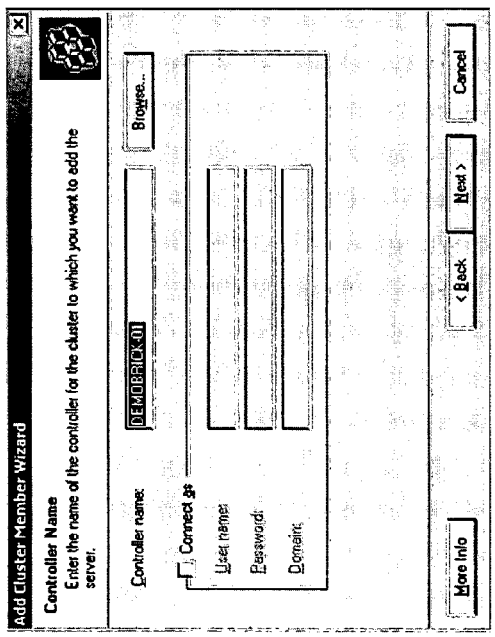

Proceeding to FIG. 12*b*, a display interface 192*b* is provided to enable the user to select a server to add to the entity. For example, the user may input a server name, user name, password and Domain. Proceeding to FIG. 12*c*, a display interface 192*c* enables a user to select a controller member to add the server to. Proceeding to FIG. 12*d*, a scan display interface 192*d* may be provided to the user to indicate system processes that may be occurring. A time bar and message output, as described above in relation to the create entity wizard, may be provided to indicate to the user current machine analysis events such as Network Load Balancing, IP address checking and/or Network Interface Card (NIC) checking. When the time bar becomes full, the process may proceed to display FIG. 12*e*.

Figure 12E:
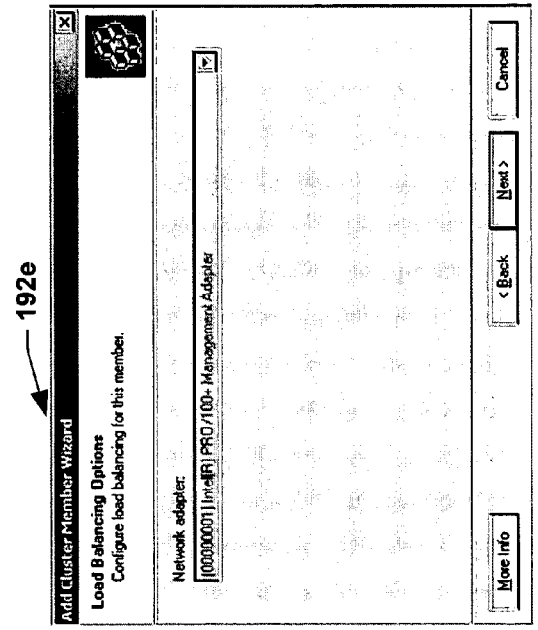
Figure 12D:
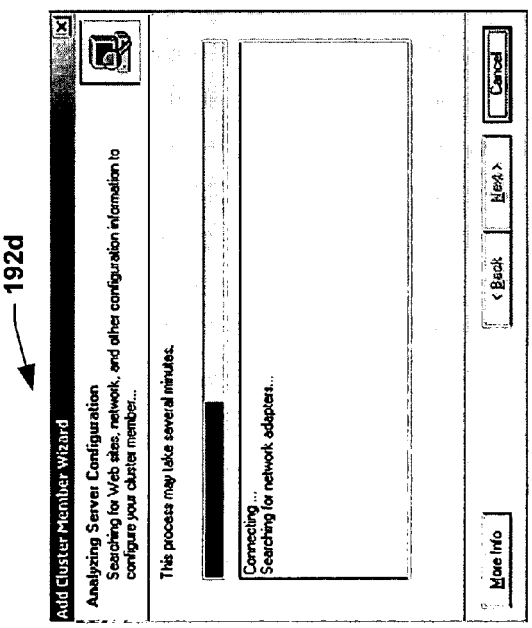
Figure 12F:
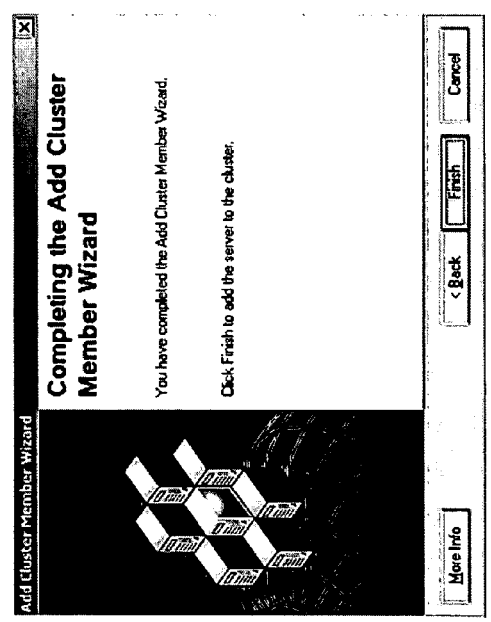

At FIG. 12*e*, a display interface 192*e* enables the user to select a load balanced NIC as described above in relation to the create entity wizard. Proceeding to FIG. 12*f*, a display interface 192*f* finish page may be provided with a finish selection input to enable the user to complete the process and to enable the system to implement the users selections from the process.

Referring now to FIGS. 13*a* through 13*f*, a configurations interface and process is illustrated relating to deploying content and/or configuration to one or more entities and/or members in accordance with the present invention. The FIGS. 13*a* through 13*f* define a user-oriented process for directing and enabling a user to deploy application content. The process may be defined in terms of a wizard, for example, that readily guides the procedure for the user. It is to be appreciated however that other illustrated sequences than depicted by the process wizard may be employed.

Figure 13A:
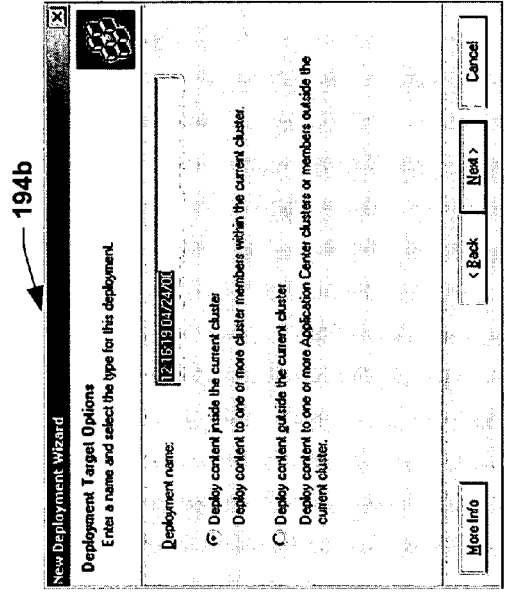
FIGS. 13a-13h illustrates a process for deploying content across an entity in accordance with one aspect of the present invention.

Referring to FIG. 13*a*, a process wizard start 194*a* for deployment illustrates a standard welcome page when the wizard is invoked. The wizard may be invoked from any suitable menu input. Selection inputs such as a next input and a back input, as described above, are provided to enable the user to get to the next step in the process and/or return to a previous step. Additionally, as described above in relation to the create entity start page, a cancel input may be provided to enable the user to discontinue the process at any desired time, and a more information input may be provided to provide the user with additional information for determining a selection. The following description will now be directed to the process of deploying content in a flow wherein the user proceeds to the next step (e.g., selects the next input). It is to be appreciated that the user may proceed back at each step to modify a previous selection and/or cancel the procedure if so desired.

Figure 13B:
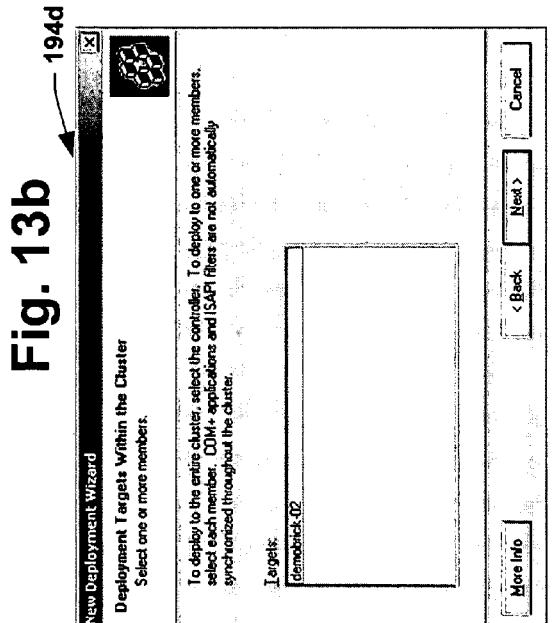
Figure 13C:
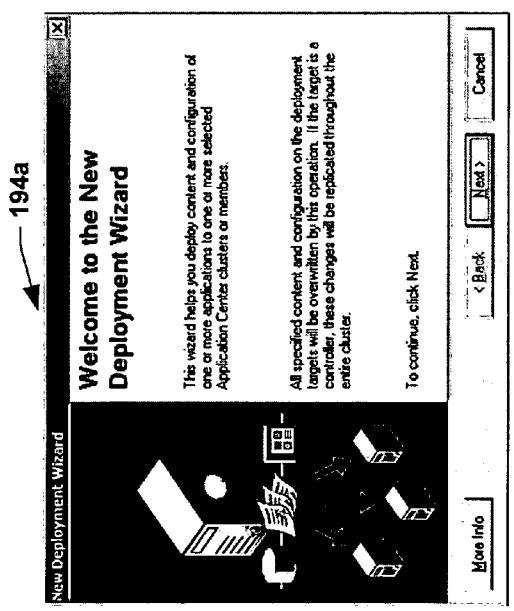
Figure 13D:
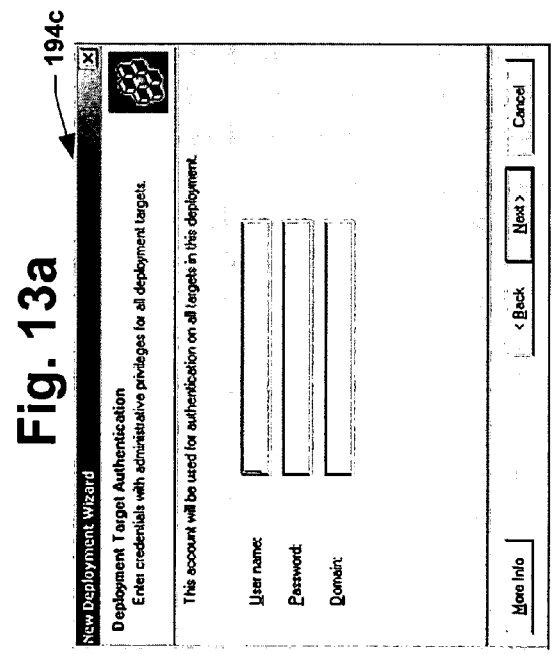
Figure 13F:
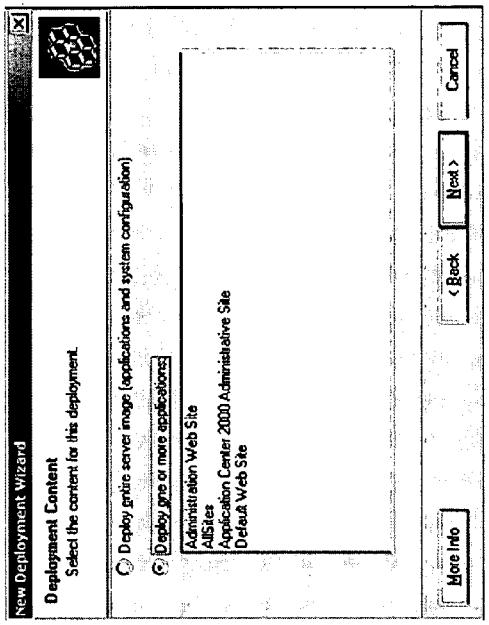

Proceeding to FIG. 13*b*, a display interface 194*b* is provided to enter a deployment name and select the type of deployment desired. For example, the user may input a name (e.g., My Deployment at 12:16:1904/24/00). Furthermore, the user may select to deploy content inside an entity or outside the entity to non-members. Proceeding to FIG. 13*c*, and if the user selects to deploy outside the current entity as described above, a display interface 194*c* enables a user to provide credentials such as a username, password, and Domain for a target and/or set of target machines. Proceeding to FIG. 13*d*, a display interface 194*d* may be provided to enable the user to select other members of the current entity to deploy to.

Figure 13H:
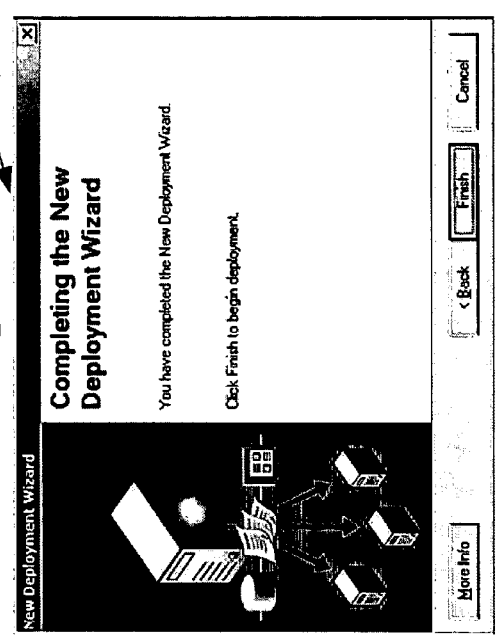
Figure 13E:
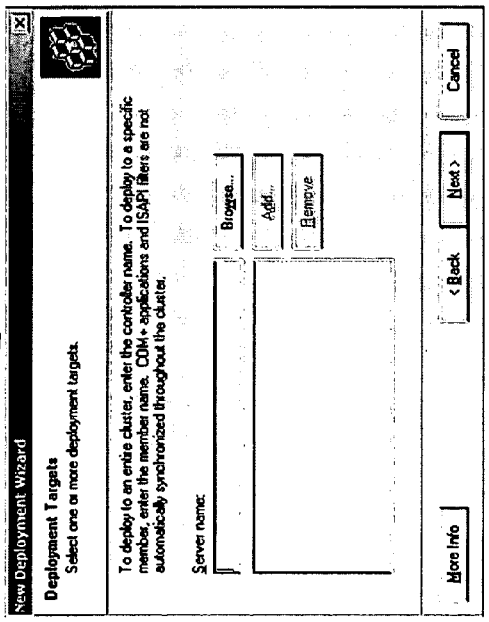
Figure 13G:
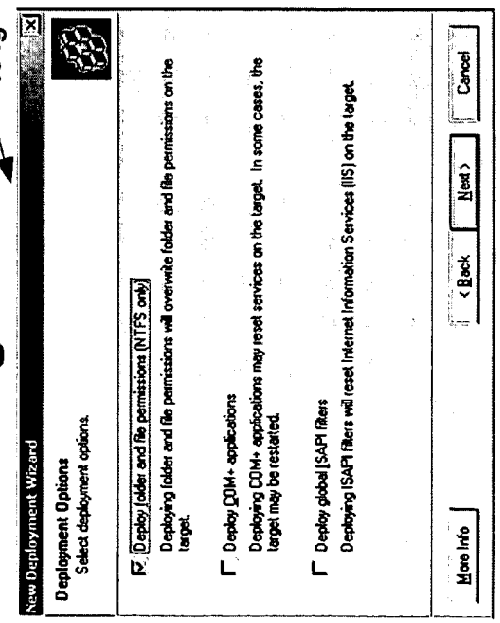

Proceeding to FIG. 13*e*, a display interface 194*e* enables the user to select additional deployment targets that may not be within the current entity. Proceeding to FIG. 13*f*, a display interface 194*f* enables the user to select one or more applications to deploy. Proceeding to FIG. 13*g*, a display interface 194*g* enables the user to select additional deployment options. The options may include, for example, deploying folder and file permissions (e.g., access/security), deploying COM+ applications, and/or deploying global ISAPI filters. Other options may include whether to restart a web server on the target machines and/or whether to deploy all available applications. Proceeding to FIG. 13*h*, a display interface 194*h* finish page may be provided with a finish selection input to enable the user to complete the process and to enable the system to implement the users selections from the process.

Figure 14:
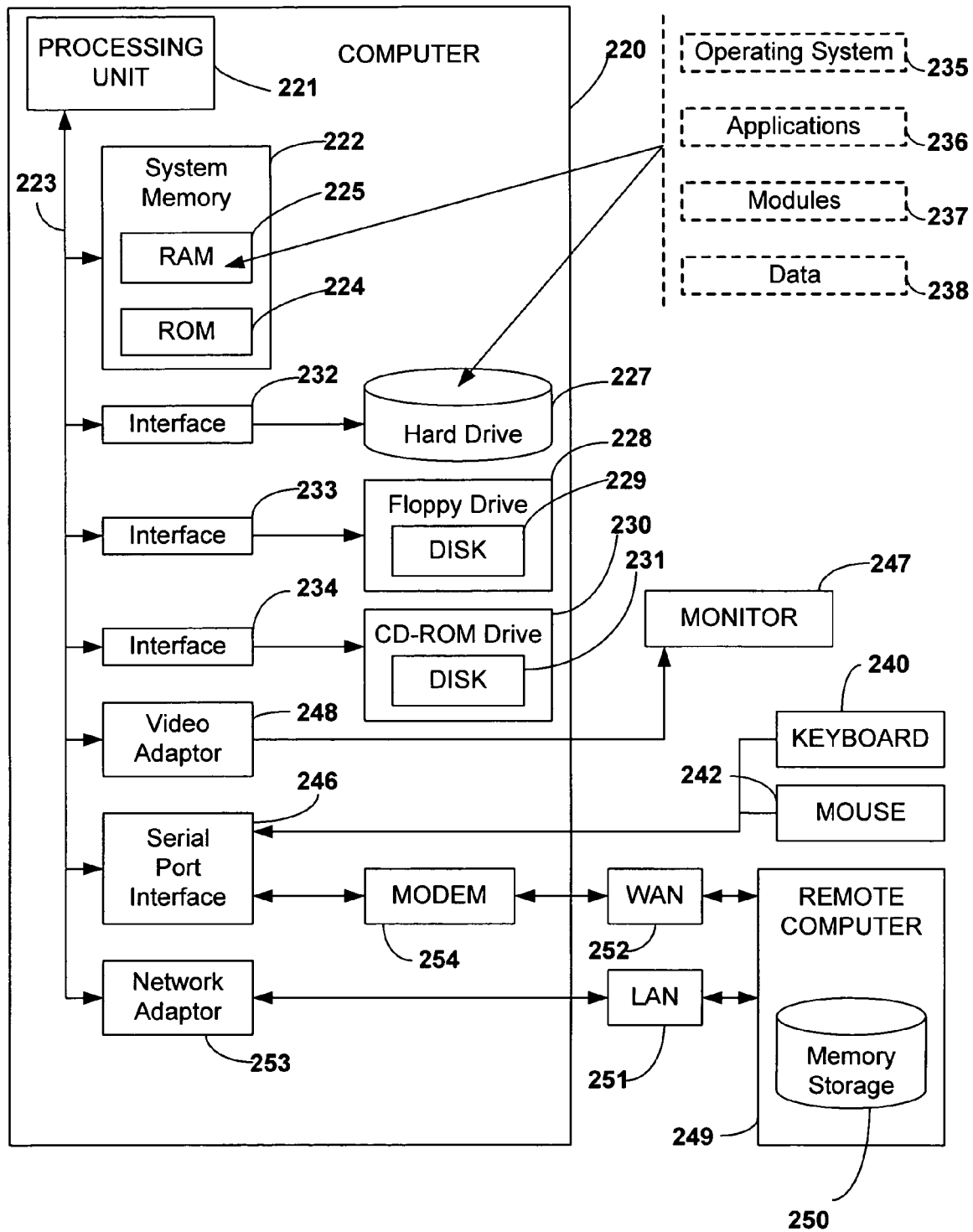
FIG. 14 is a schematic block diagram illustrating a system in accordance with one aspect of the present invention.

In order to provide a context for the various aspects of the invention, FIG. 14 and the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputers, mainframe computers, as well as personal computers, handheld computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 14, an exemplary system for implementing the various aspects of the invention includes a conventional computer 220, including a processing unit 221, a system memory 222, and a system bus 223 that couples various system components including the system memory to the processing unit 221. The processing unit may be any of various commercially available processors, including but not limited to Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also may be employed as the processing unit 221.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 224 and random access memory (RAM) 225. A basic input/output system (BIOS), containing the basic routines that help to transfer information between elements within the server computer 220, such as during start-up, is stored in ROM 224.

The computer 220 further includes a hard disk drive 227, a magnetic disk drive 228, e.g., to read from or write to a removable disk 229, and an optical disk drive 230, e.g., for reading a CD-ROM disk 231 or to read from or write to other optical media. The hard disk drive 227, magnetic disk drive 228, and optical disk drive 230 are connected to the system bus 223 by a hard disk drive interface 232, a magnetic disk drive interface 233, and an optical drive interface 234, respectively. The drives and their associated computer-readable media provide nonvolatile storage of data, data structures, computer-executable instructions, etc. for the server computer 220. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 225, including an operating system 235, one or more application programs 236, other program modules 237, and program data 238. The operating system 235 in the illustrated computer may be a Microsoft operating system (e.g., Windows NT operating system). It is to be appreciated that other operating systems may be employed such as UNIX for example.

A user may enter commands and information into the server computer 220 through a keyboard 240 and a pointing device, such as a mouse 242. Other input devices (not shown) may include a microphone, a joystick, a game pad, a satellite dish, a scanner, or the like. These and other input devices are often connected to the processing unit 221 through a serial port interface 246 that is coupled to the system bus, but may be connected by other interfaces, such as a parallel port, a game port or a universal serial bus (USB). A monitor 247 or other type of display device is also connected to the system bus 223 via an interface, such as a video adapter 248. In addition to the monitor, computers typically include other peripheral output devices (not shown), such as speakers and printers.

The computer 220 may operate in a networked environment using logical connections to one or more remote computers, such as a remote client computer 249. The remote computer 249 may be a workstation, a server computer, a router, a peer device or other common network node, and typically includes many or all of the elements described relative to the server computer 220, although only a memory storage device 250 is illustrated in FIG. 14. The logical connections depicted in FIG. 14 include a local area network (LAN) 251 and a wide area network (WAN) 252. Such networking environments are commonplace in offices, enterprise-wide computer networks, intranets and the Internet.

When employed in a LAN networking environment, the server computer 220 may be connected to the local network 251 through a network interface or adapter 253. When utilized in a WAN networking environment, the server computer 220 generally may include a modem 254, and/or is connected to a communications server on the LAN, and/or has other means for establishing communications over the wide area network 252, such as the Internet. The modem 254, which may be internal or external, may be connected to the system bus 223 via the serial port interface 246. In a networked environment, program modules depicted relative to the computer 220, or portions thereof, may be stored in the remote memory storage device. It will be appreciated that the network connections shown are exemplary and other means of establishing a communications link between the computers may be used.

In accordance with the practices of persons skilled in the art of computer programming, the present invention has been described with reference to acts and symbolic representations of operations that are performed by a computer, such as the computer 220, unless otherwise indicated. Such acts and operations are sometimes referred to as being computer-executed. It will be appreciated that the acts and symbolically represented operations include the manipulation by the processing unit 221 of electrical signals representing data bits which causes a resulting transformation or reduction of the electrical signal representation, and the maintenance of data bits at memory locations in the memory system (including the system memory 222, hard drive 227, floppy disks 229, and CD-ROM 231) to thereby reconfigure or otherwise alter the computer system's operation, as well as other processing of signals. The memory locations wherein such data bits are maintained are physical locations that have particular electrical, magnetic, or optical properties corresponding to the data bits.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A computer implemented method for interfacing and managing a plurality of entities as if a single entity using a user interface that is displayed on a computer, the method comprising:

displaying, in the user interface on the computer, a representation of a collection of independent servers as a single entity, an individual representation of each independent server being associated with the single entity, wherein if an action is performed on the representation of the collection of independent servers, then the action is propagated to each independent server in the collection, whereas if the action is performed on an individual representation of an independent server in the collection, then the action is directed to the independent server;

displaying, in the user interface, a new cluster wizard that upon receiving input specifying a new server to be added to a new cluster, creates the new cluster and adds the new server to the cluster;

displaying, in the user interface, at least two selectable load-balancing options for the collection of independent servers, wherein one of the at least two selectable load-balancing options configures third-party load-balancing and the other option configures no load-balancing;

displaying, in the user interface, an add cluster member wizard that upon receiving input specifying a new server to add to the collection of independent servers, adds the new server to the collection of independent servers; and displaying, in the user interface, a new deployment wizard that upon receiving input specifying content to be deployed across the collection of independent servers, deploys the content to each of the independent servers in the collection.

2. The method of claim 1 further comprising displaying a first set of objects in the user interface that represent an aggregated display of performance indicators received from each of the independent servers in the collection.

3. The method of claim 2 wherein displaying the first set of objects further includes providing an aggregate display of events for the collection, the aggregate display of events reflecting at least one of the following:

errors arising from at least one of the independent servers, operating system operations, system monitor logs, or external entities;

warnings arising from at least one of the independent servers, operating system operations, system monitor logs, or external entities; or other system activities arising from at least one of the independent servers, operating system operations, system monitor logs, or external entities.

4. The method of claim 2 wherein displaying the first set of objects further includes providing a display of events for an independent server of the collection.

5. The method of claim 2 wherein displaying the first set of objects further includes providing an aggregated display of status of the collection, the aggregated display of status reflecting at least one of offload-balancing status of the entity, current synchronization status of the entity, entity health metrics, monitor related metrics, or synchronization loop state.

6. The method of claim 2 wherein displaying the first set of objects further includes providing a display of the status of an independent server of the collection.

7. The method of claim 2 wherein displaying the first set of objects further includes providing a display of applications for an independent server of the collection.

8. The method of claim 1 further comprising:

analyzing configurations of each independent server of the collection;

selecting an entity type for the collection; and selecting load balancing options comprising selecting whether Web sites primarily served by the collection are intranet sites or internet sites.

9. The method of claim 8 wherein analyzing configurations comprises at least one of:

integrated operating system load balancing configuration analysis;

IP address checking;

Network analysis;

Network Interface Card (NIC) checking;

or Software system analysis.

10. The method of claim 8 wherein selecting an entity type comprises selecting one of at least a web cluster, a COM+ Component Services application cluster, or a COM+ Component Services routing cluster.

11. The method of claim 8 wherein selecting load balancing options comprises selecting integrated operating system load balancing.

12. The method of claim 8 wherein selecting load balancing options comprises selecting a network interface card (NIC) to employ for load balancing.

13. The method of claim 1 wherein the content to be deployed comprises at least one of:

folder and file permissions;

COM+ Component Services applications; or global ISAPI filters.

14. The method of claim 1 wherein displaying the representation further comprises arranging the independent servers of the collection to form a topological representation.

15. The method of claim 14, further comprising traversing the topological representation to a more or less granular selection.

* * * * *